(12) United States Patent
Kondo et al.

(10) Patent No.: US 11,630,615 B2
(45) Date of Patent: Apr. 18, 2023

(54) NON-TRANSITORY COMPUTER READABLE STORAGE MEDIUM STORING SET OF PROGRAM INSTRUCTIONS FOR TRANSMITTING FIRST AND SECOND SETS OF PRINT DATA

(71) Applicant: BROTHER KOGYO KABUSHIKI KAISHA, Nagoya (JP)

(72) Inventors: Koichi Kondo, Nuyama (JP); Tomoyasu Fukui, Nuyama (JP); Ryuichi Kanda, Nagoya (JP); Hiromichi Nampo, Kiyosu (JP); Michihiko Furuhashi, Kiyosu (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/388,854

(22) Filed: Jul. 29, 2021

(65) Prior Publication Data
US 2022/0035579 A1  Feb. 3, 2022

(30) Foreign Application Priority Data
Jul. 30, 2020 (JP) .............................. JP2020-129393

(51) Int. Cl.
*G06F 3/12* (2006.01)
(52) U.S. Cl.
CPC ............ *G06F 3/1215* (2013.01); *G06F 3/126* (2013.01)

(58) Field of Classification Search
CPC .......... H04N 1/00567; H04N 1/00665; H04N 1/2353; G03G 2215/00215; G03G 2215/0021
USPC ........................ 358/1.15, 1.9, 2.1, 1.13, 1.12
See application file for complete search history.

(56) References Cited

U.S. PATENT DOCUMENTS

| | | | |
|---|---|---|---|
| 2007/0234618 A1* | 10/2007 | Adams .................. | G09F 3/0288 40/638 |
| 2010/0188700 A1* | 7/2010 | Fujimori ............... | G06F 3/1205 358/1.15 |

FOREIGN PATENT DOCUMENTS

JP        2010-017937 A      1/2010

* cited by examiner

Primary Examiner — Jamares Q Washington
(74) Attorney, Agent, or Firm — Kenealy Vaidya LLP

(57) ABSTRACT

A non-transitory computer readable storage medium stores a set of program instructions installed on and executed by a computer provided in a terminal device. The set of program instructions includes receiving a print start operation to start printing images represented by first and second sets of print data. The first set of print data represents a first print image correlated with a first print medium type. The second set of print data represents a second print image correlated with a second print medium type. The set of program instructions include transmitting the first set of print data, and transmitting the second set of print data to the printer. The second print image is to be printed after the first print image is printed. The transmitting the second set of print data is performed before the printer complete printing the first print image.

12 Claims, 15 Drawing Sheets

NON-TRANSITORY COMPUTER READABLE STORAGE MEDIUM STORING SET OF PROGRAM INSTRUCTIONS FOR TRANSMITTING FIRST AND SECOND SETS OF PRINT DATA

CROSS REFERENCE TO RELATED APPLICATION

This application claims priority from Japanese Patent Application No. 2020-129393 dated Jul. 30, 2020. The entire content of the priority application is incorporated herein by reference.

TECHNICAL FIELD

The present disclosure relates to a print control program for printing a plurality of printing images using a plurality of types of printing media and a printer.

BACKGROUND

A tape printer for creating composite labels are known in the art. The tape printer prints a plurality of labels that is to be overlaid to form a single composite label.

In this conventional technique, after a plurality of tape print images is generated using a plurality of editing screens displayed on an image display device connected to the printer, a composite image of the plurality of tape print images is displayed on the image display device. Thereafter, in response to a print button pressed by a user, confirmation is made as to whether a cartridge having a tape corresponding to a tape print image is mounted on the tape printer. When such a cartridge is mounted on the tape printer, the tape print image is printed on the tape.

When printing a tape print image on one editing screen is completed, confirmation is made as to whether a cartridge having a tape corresponding to a next tape print image on a next editing screen is mounted on the tape printer. When such a cartridge is mounted on the tape printer, the tape print image is printed on the tape.

SUMMARY

In the conventional technique described above, after the user presses the print button, the following procedures are required to complete printing all the plurality of tape print images: confirm that the cartridge corresponding to the first tape print image→transmit first print data→print the first tape print image→confirm that the cartridge corresponding to the second tape print image→transmit second print data→print the second tape print image→ . . . .

Accordingly, after the user presses the print button, the long time period according to the number of tapes to be overlaid is required by for printing all the print images is completed.

In view of the foregoing, it is an object of the present disclosure to provide a printer and a print control program capable of reducing a time period required for printing a plurality of images corresponding to a plurality of layers using a plurality of types of printing media.

In order to attain the above and other objects, the disclosure provides a non-transitory computer readable storage medium storing a set of program instructions installed on and executed by a computer provided in a terminal device configured to be connected to a printer. The set of program instructions includes: performing an operation reception process to receive via an operation interface a print start operation to start printing a plurality of print images which is represented by respective ones of a plurality of sets of print data, each of the plurality of print images being to be printed using a different print medium in the printer, the plurality of sets of print data including a first set of print data and a second set of print data, the first set of print data representing a first print image correlated with a first print medium type, the second set of print data representing a second print image correlated with a second print medium type; performing a first data transmission process to transmit the first set of print data to the printer in response to receiving the print start operation in the operation reception process; performing a second data transmission process to transmit the second set of print data to the printer, the second print image based on the second set of print data being to be printed after the first print image is printed. The second data transmission process is performed before the printer complete printing the first print image.

According to another aspect, the disclosure provides a printer. The printer includes a mount portion, a print portion, and a controller. A print medium is mountable in the mount portion. The print portion is configured to print a plurality of print images which is represented by respective ones of a plurality of sets of print data. Each of the plurality of print images is to be printed using a different print medium type in the printer. The plurality of sets of print data includes a first set of print data and a second set of print data. The first set of print data represents a first print image correlated with a first print medium type. The second set of print data represents a second print image correlated with a second print medium type. The controller is configured to perform: a first data reception process to receive the first set of print data from a terminal device; and a second data reception process to receive the second set of print data from the terminal device, the second print image based on the second set of print data being to be printed after the first print image is printed. The second data reception process is performed before printing the first print image is completed.

BRIEF DESCRIPTION OF THE DRAWINGS

The particular features and advantages of the disclosure as well as other objects will become apparent from the following description taken in connection with the accompanying drawings, in which.

DETAILED DESCRIPTION

Embodiments of the present disclosure will be described while referring to the attached drawings.

First Embodiment

First embodiment of the present disclosure will be described.

Overall Structure of a Printing System

Figure 1:
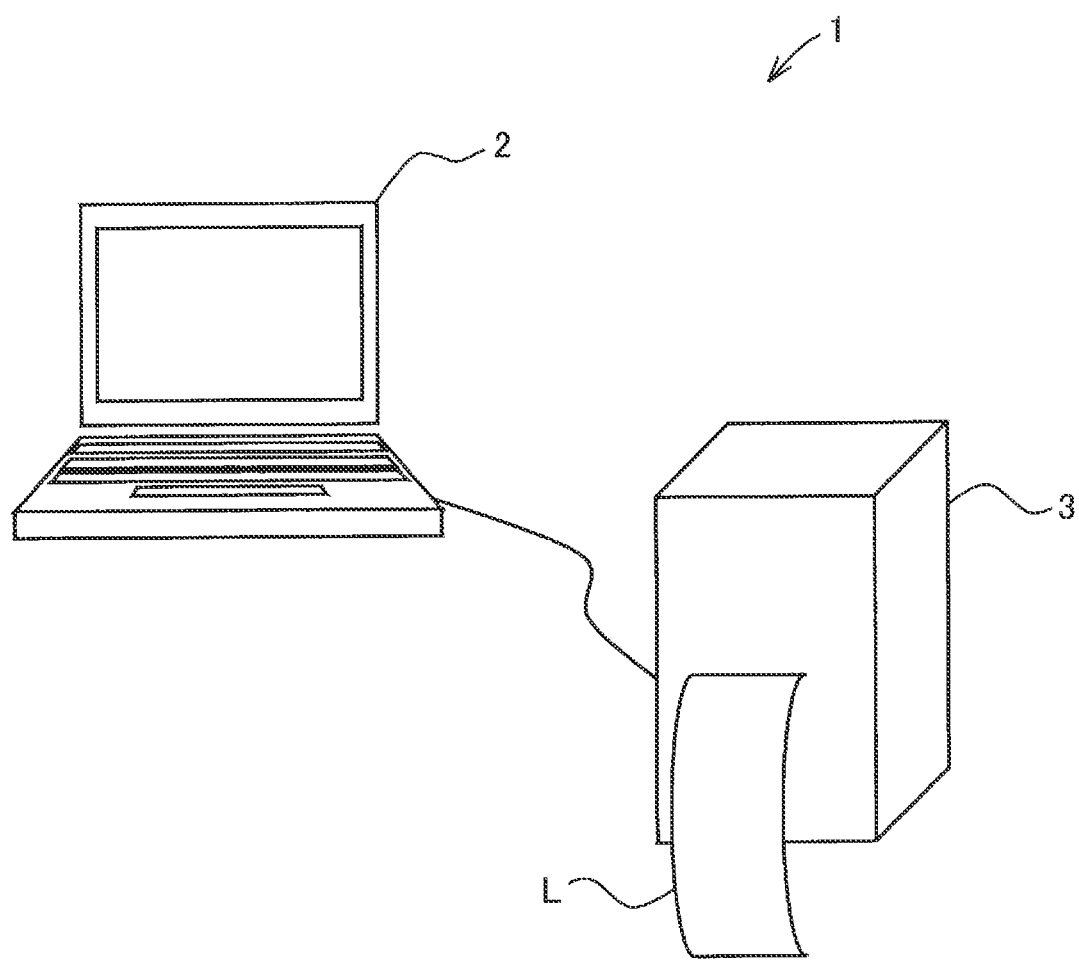
FIG. 1 is a schematic diagram illustrating a printing system according to a first embodiment.

FIG. 1 shows the overall structure of a printing system according to an embodiment. In FIG. 1, a printing system 1 has an operation terminal 2 configured of a common personal computer, for example, and a label printer 3 connected to the operation terminal 2. The operation terminal 2 is connected to the label printer 3 so as to be capable of exchanging information with the label printer 3. The operation terminal 2 may also be configured of a smartphone, a mobile information terminal, or the like. The label printer 3 creates print labels L based on user operations performed on the operation terminal 2. The labels L are examples of a printed matter, and the label printer 3 is an example of a printer.

Operation Terminal

Figure 2:
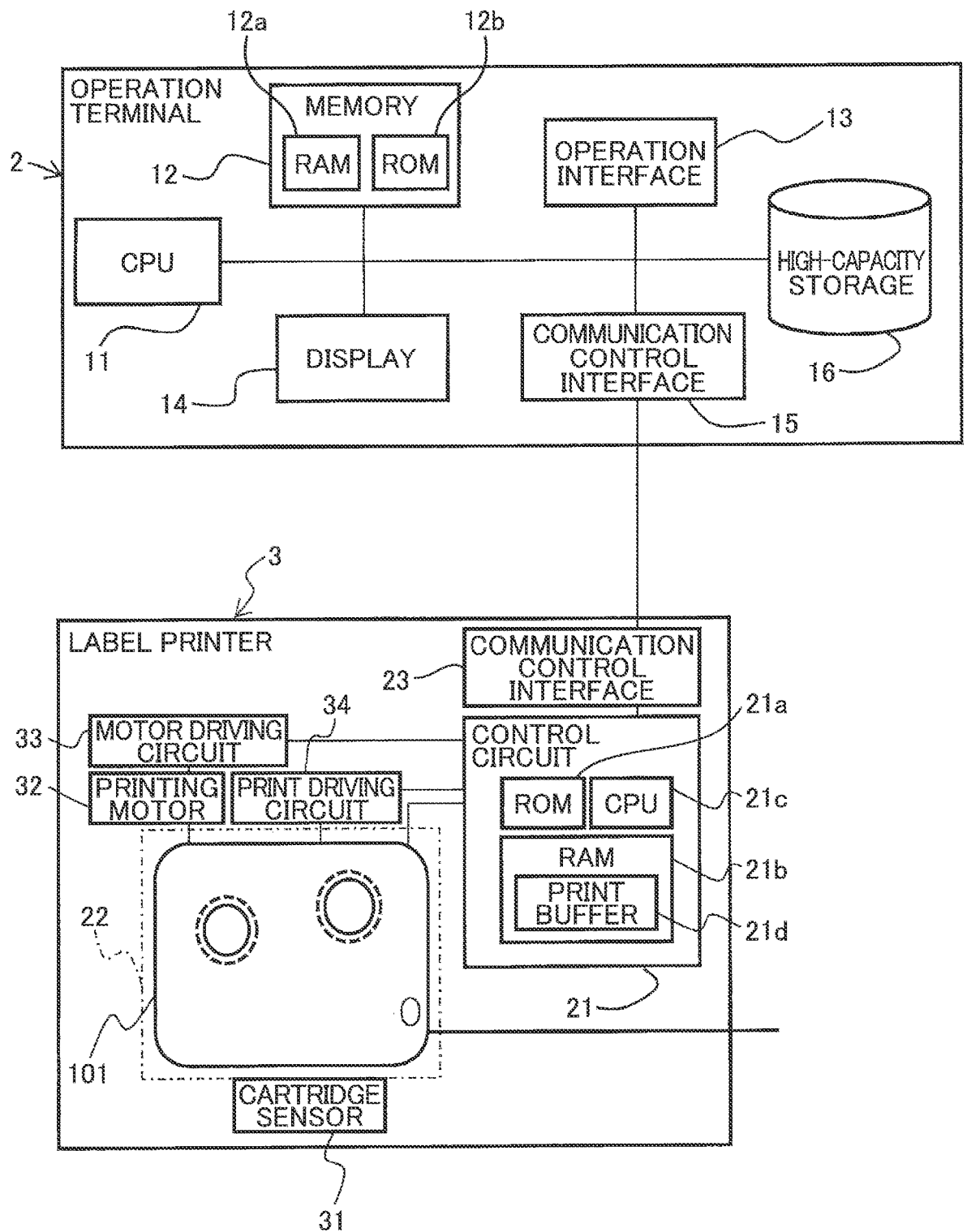
FIG. 2 is a block diagram illustrating functional configurations of an operation terminal and a label printer.

As shown in FIG. 2, the operation terminal 2 is provided with a CPU 11, a memory 12, an operation interface 13, a display 14, a communication control interface 15, and a high-capacity storage 16. The memory 12 is configured of a RAM 12a, a ROM 12b, and the like, for example. The CPU 11 is an example of a controller.

The user inputs instructions and information on the operation interface 13. The display 14 displays various information and messages. Note that the operation interface 13 and the display 14 may be configured as a touchscreen that possesses functions of both the operation interface 13 and the display 14. The communication control interface 15 controls the exchange of signals with the label printer 3.

The high-capacity storage 16 stores various programs and information. The ROM 12b of the memory 12 stores a print control program for controlling the CPU 11 to execute the various steps in the flowcharts and sequence diagrams of FIGS. 5-12 and 14 described later. As an alternative, the print control program may be stored in the high-capacity storage 16. Note that the high-capacity storage 16 is not limited to a built-in memory, but may be a suitable external memory such as an SD Card.

The CPU 11 uses the temporary storage function of the RAM 12a to exchange various signals with the various processes and the label printer 3 according to programs pre-stored in the ROM 12b and the high-capacity storage 16.

Label Printer

As shown in FIG. 2, the label printer 3 has a control circuit 21, a cartridge holder 22, a cartridge sensor 31, a communication control interface 23, a printing motor 32, a motor driving circuit 33, and a print driving circuit 34. The cartridge holder 22 is an example of a mount portion.

A cartridge 101 is detachably mounted in the cartridge holder 22. The cartridge sensor 31 is disposed in the cartridge holder 22 for detecting the type of the cartridge 101 according to a suitable method known in the art. The method of detection may be mechanical detection or optical or magnetic detection.

The control circuit 21 is provided with a ROM 21a, a RAM 21b, and a CPU 21c. The RAM 21b is provided with a print buffer 21d. The label printer 3 can exchange information with the operation terminal 2 by connecting the control circuit 21 to the communication control interface 15 of the operation terminal 2 via the communication control interface 23. The CPU 21c is an example of a controller.

Cartridge and Cartridge Holder

Figure 3:
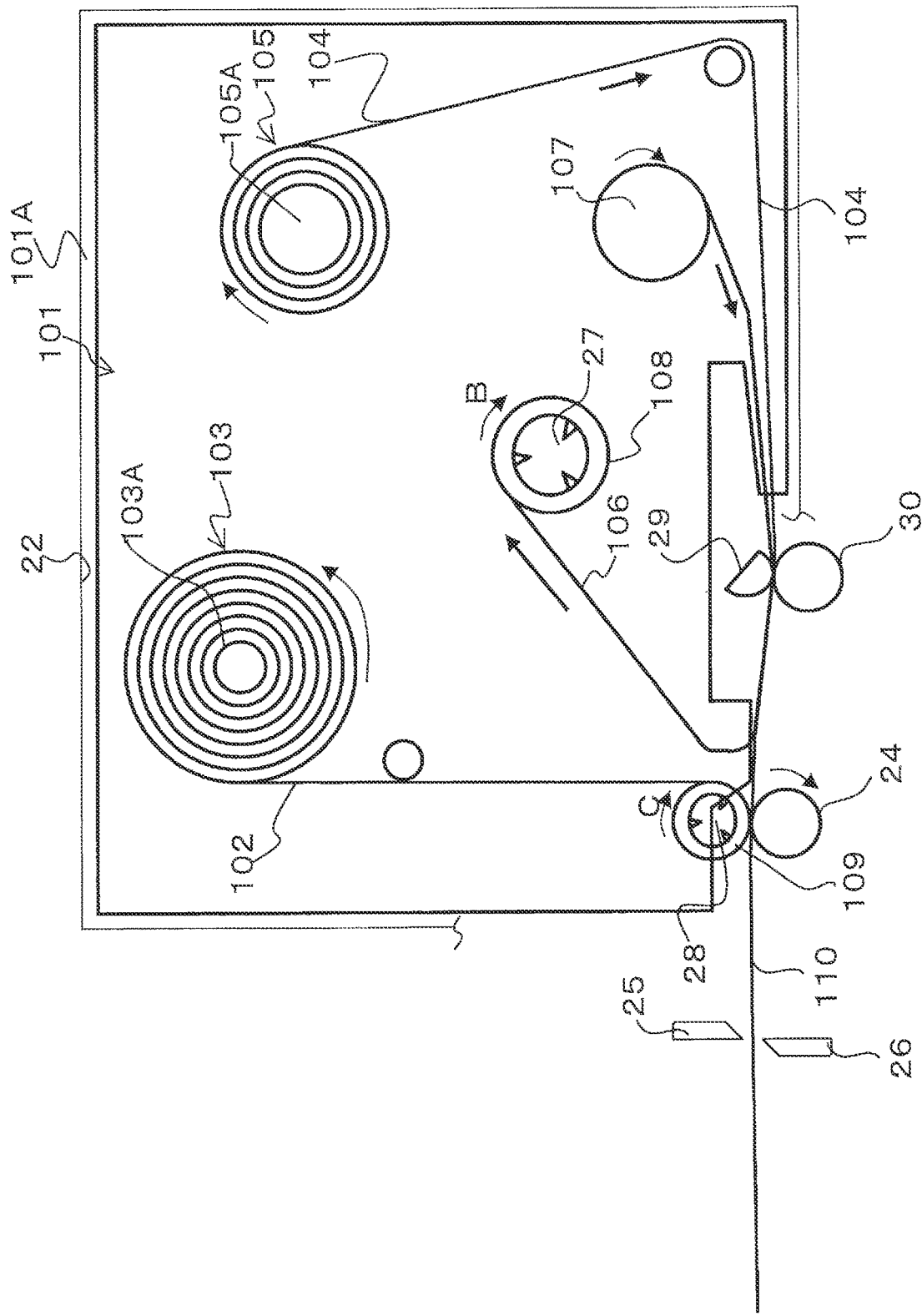
FIG. 3 is a schematic diagram illustrating configurations of a cartridge and a cartridge holder.

FIG. 3 shows a detailed structure of the cartridge 101 and the related structure of the cartridge holder 22. In FIG. 3, the cartridge 101 has a housing 11A, a first roll 103, a second roll 105, a ribbon supply roll 107, a ribbon take-up roller 108, and a tape feed roller 109.

The first roll 103 includes a spool 103A rotatably supported in the housing 101A, and the base tape 102 wound around the spool 103A. The base tape 102 is configured of a bonding adhesive layer, a base layer, a mounting adhesive layer, and a release layer, for example. These layers are laminated sequentially in the stated order from the inward-facing side of the wound base tape 102 forming the first roll 103 toward the opposite side.

The second roll 105 includes a spool 105A rotatably supported in the housing 101A. The cover film 104 having the same width as the base tape 102 is wound about the spool 105A. Note that, while depicted as concentric circles in the drawings for simplification, the first roll 103 and the second roll 105 are actually wound in a spiral shape.

The cover film 104 and an ink ribbon 106 are examples of the printing medium. The cover film 104, the base tape 102, and the like are indirectly mounted in the cartridge holder 22 by mounting the cartridge 101 in the cartridge holder 22, as described above.

The ribbon supply roll 107 pays out the ink ribbon 106. The ribbon take-up roller 108 takes up the ink ribbon 106 that has been used for printing. Note that the ink ribbon 106 is unnecessary when the cover film 104 is a thermal tape that can produce a prescribed color when heated.

The tape feed roller 109 is rotatably supported near a tape discharge portion of the cartridge 101. The tape feed roller 109 bonds the base tape 102 to the cover film 104 with pressure to form the print label tape 110 while conveying the same. The cover film 104 is pressed by the tape feed roller 109 and a pressure roller 24 opposing the tape feed roller 109.

A ribbon take-up roller drive shaft 27 and a tape feed roller drive shaft 28 are provided in the cartridge holder 22. The ribbon take-up roller drive shaft 27 is provided for taking up the portion of the ink ribbon 106 already used for printing. The tape feed roller drive shaft 28 is provided for conveying the print label tape 110 described above. The drive force of the printing motor 32 is transmitted to the ribbon take-up roller drive shaft 27 and the tape feed roller drive shaft 28, and the ribbon take-up roller 108 and the tape feed roller 109 are driven to rotate in association with the corresponding ribbon take-up roller drive shaft 27 and the tape feed roller drive shaft 28. The CPU 21c controls the drive of the printing motor 32 via the motor driving circuit 33.

The cartridge holder 22 is also provided with a print head 29 that prints prescribed content on the cover film 104 as the cover film 104 is conveyed. The print head 29 is an example of a print portion.

A fixed blade 25 and a movable blade 26 are provided along the conveying path of the print label tape 110 on the downstream side of the tape feed roller 109 and the pressure roller 24. In cooperation with the fixed blade 25, the movable blade 26 cuts through the print label tape 110 in the thickness direction.

Outline of Label Printer Operations

With the label printer 3 having the above construction, the cover film 104 and the ink ribbon 106 become interposed between the print head 29 and a platen roller 30 opposing the print head 29 when the cartridge 101 is mounted in the cartridge holder 22. At the same time, the base tape 102 and the cover film 104 are interposed between the tape feed roller 109 and the pressure roller 24 opposing the tape feed roller 109. When the ribbon take-up roller 108 and the tape feed roller 109 are driven to rotate in synchronization in the directions indicated by the respective arrows B and C in FIG. 3, the pressure roller 24 and the platen roller 30 rotate. The base tape 102 is paid out from the first roll 103 and supplied to the tape feed roller 109. The cover film 104 is paid out from the second roll 105 while the print driving circuit 34 energizes a plurality of heating elements in the print head 29 to print on the cover film 104. The ribbon take-up roller drive shaft 27 drives the ribbon take-up roller 108 to take up ink ribbon 106 that was used for printing on the cover film 104.

The base tape 102 and the printed portion of the cover film 104 are integrally bonded between the tape feed roller 109 and the pressure roller 24 to form the print label tape 110, and the print label tape 110 is conveyed out of the cartridge 101. The portion of the print label tape 110 conveyed out of the cartridge 101 is cut off through the cooperative operations of the fixed blade 25 and the movable blade 26, producing a print label L.

Composite Labels

In the embodiment, a plurality of uniquely different print labels L created by the label printer 3 are overlaid in the thickness direction and bonded to each other. The bonded labels are then fixed in that state to a desired object. That is, different types of cartridges 101 are sequentially mounted in the cartridge holder 22 of the label printer 3 to create uniquely different print labels L that are subsequently overlaid on each other. At this time, it is possible to create print labels L of different tape colors by selectively using different types of cartridges 101 provided with different types of base tapes 102 and cover films 104, for example. Similarly, it is possible to create print labels L while varying the color in which the print head 29 prints by selectively using different types of cartridges 101 having different types of ink ribbons 106. Note that at least one of the cover film 104 and the base tape 102 used for making the labels may be common if the ink ribbon 106 is varied. Alternatively, at least one of the cover film 104 and the ink ribbon 106 used for creating the labels may be common if the base tape 102 is varied. These cases are included in a concept to the use of different types of print media. As an example of this, a case of bonding together three different types of print labels L will be described with reference to FIGS. 4A-4C.

Figure 4A:
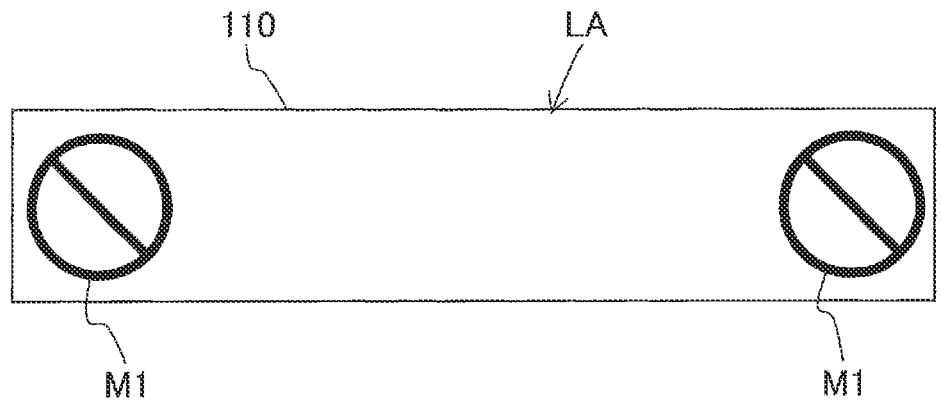
FIGS. 4A-4C are plan views respectively illustrating a top label, a bottom label, and a composite label created by bonding these two labels.

FIG. 4A shows one print label LA that will form the topmost layer when the two print labels are overlaid. In this example, a prohibition mark M1 is formed on each longitudinal end of the print label LA cut from a print label tape 110 to a prescribed length. Each prohibition mark M1 has a circle with a diagonal line through the inner area therein.

Figure 4B:
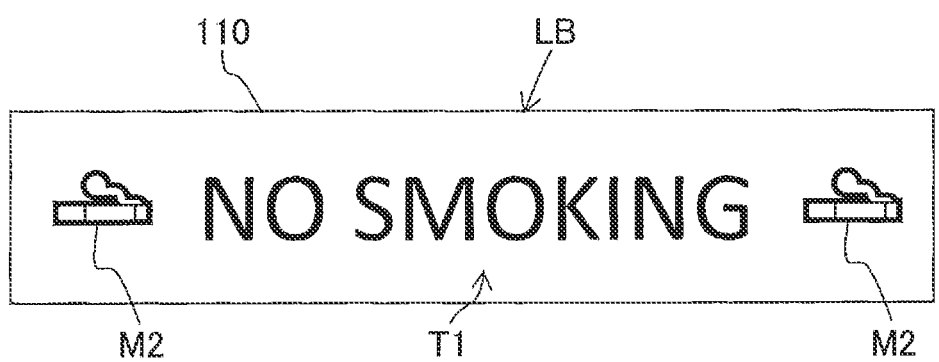

FIG. 4B shows another print label LB that will form the bottom layer when the two print labels are overlaid. In this example, a cigarette icon M2 is formed on each longitudinal end of the print label LB that has been cut from a print label tape 110 to the prescribed length. Further, text T1 is formed in the longitudinal center region of the cut print label LB. Each cigarette icon M2 is depicts a smoking cigarette. The text T1 represents "NO SMOKING".

Figure 4C:
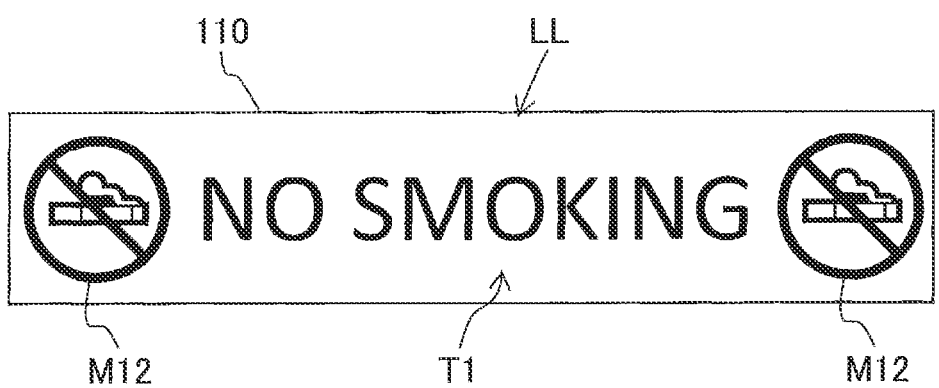

In this example, the print label LA shown in FIG. 4A is transparent and may have a color. Accordingly, by overlaying (bonding together) the print label LA as a top label and the print label LB as a bottom label, the print label LL shown in FIG. 4C is produced. Note that the print label LA and the print label LB in this example all have the same width and same length. Hereinafter, the print label LL in the embodiment will be referred to as the "composite label LL." Further, the print label LA will be called the "top label LA," and the print label LB will be called the "bottom label LB".

As a result of overlaying the two print labels, the prohibition marks M1 and the cigarette icons M2 on both longitudinal ends of the tape portions are overlapped to configure composite "no smoking" symbols M12 on the composite label LL. Further, the text T1 is arranged between the two "no smoking" symbols M12.

In other words, a set of print data for creating the composite label LL is set for each of a plurality of layers to form a plurality of labels. In this example, a set of print data is set for each of two layers needed to form the top label LA, and the bottom label LB, and two corresponding print images are formed in the respective layers.

Specifically, a set of print data for printing the top label LA having the prohibition mark M1 on both ends is provided for the topmost layer or first of the two layers; and a set of print data for printing the middle label LB having the cigarette icon M2 on both ends and the "NO SMOKING" text T1 is provided for the bottom layer or second of the two layers. The prohibition marks M1 are formed on the top label LA as the print image for the first layer according to the set of print data for the first layer. The cigarette icons M2 and the "NO SMOKING" text T1 are formed on the middle label LB as the print image for the second layer according to the set of print data for the second layer.

Feature of the Embodiment

One feature of the embodiment having the above configuration is the method of exchanging information between the operation terminal 2 and the label printer 3 when print images are formed with the label printer 3 based on a plurality of sets of print data to create a plurality of print labels L, as described above. Below, a case in which the top label LA and the bottom label LB described above are created on the label printer 3 as the plurality of uniquely different print labels L is described in due order.

Control Procedure

A control procedure executed in tandem by the CPU 11 of the operation terminal 2 and the CPU 21c of the label printer 3 according to the embodiment will be described with reference to the sequence diagram in FIG. 5. A control-terminal part of the print control procedure is executed by a print control program included in the programs stored in the ROM 12b. By executing this procedure, the CPU 11 implements the print control method described below. A label-printer part of the print control procedure is executed by a control program stored in the ROM 21a.

Figure 5:
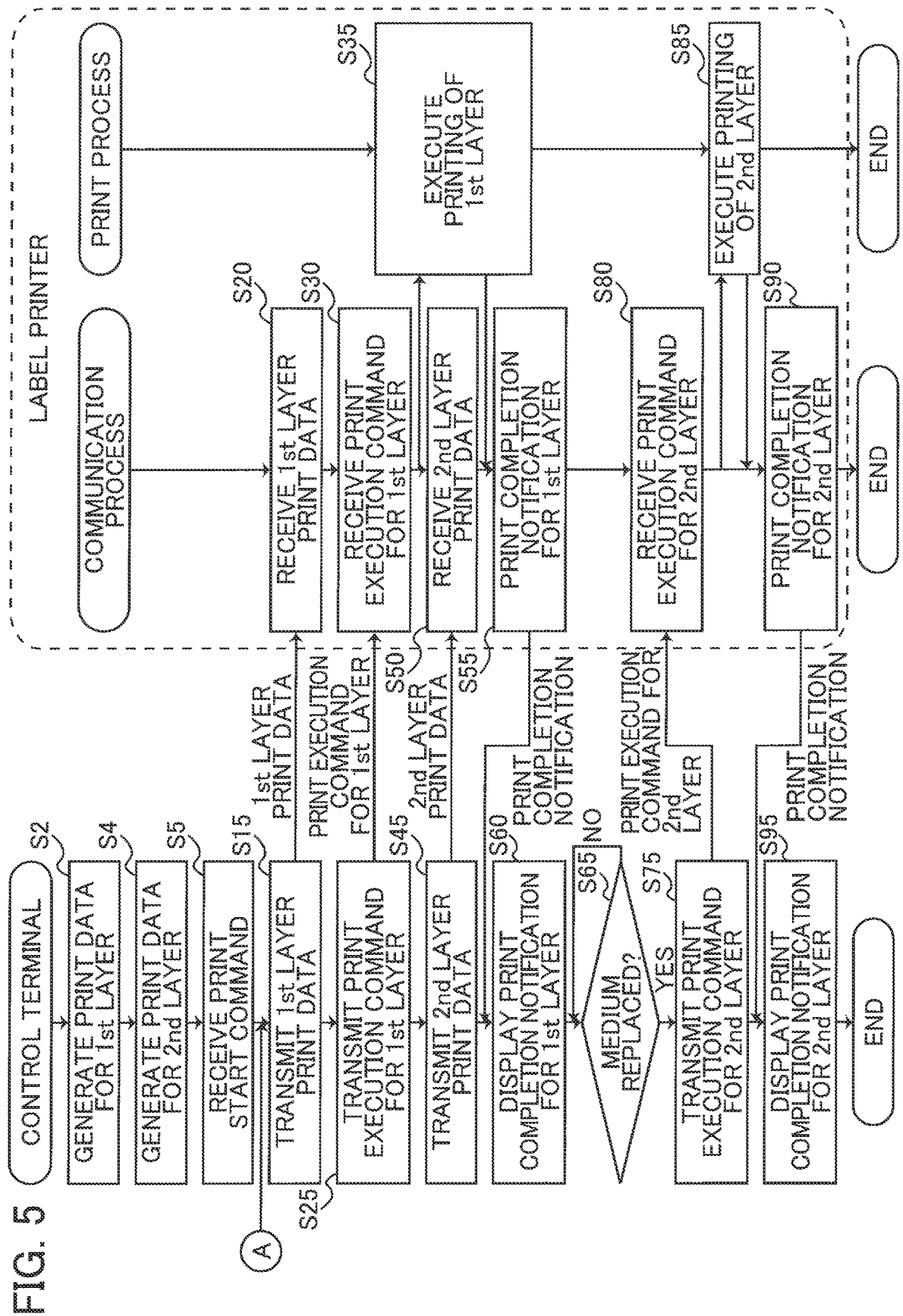
FIG. 5 is a sequence diagram illustrating a control procedure executed in tandem by the control terminal and the label printer according to the first embodiment.

In S2 of FIG. 5 the CPU 11 of the operation terminal 2 generates the set of print data for the top label LA. For example, for the top label LA shown in FIG. 4A, the CPU 11 receives editing operation of the prohibition marks M1, and generates the set of print data for printing the prohibition marks M1 as the print image to be printed on the top label LA. The set of print data for the top label LA is correlated with the type of the ink ribbon 106 for printing the prohibition marks M1. In other words, the set of print data for the top label LA (or a print image (marks M1) represented by the set of print data) is correlated with the type of the cartridge 101 for printing the prohibition marks M1. To achieve this correlation, type information for the cartridge 101 may be included in the set of print data, or the set of print data or a print image corresponding to the set of print data may be linked through a suitable method to type information of the cartridge 101 stored in an appropriate separate location.

At this time, the type of the cartridge 101 and the type of the ink ribbon 106 included the cartridge 101 are examples of the first medium type. The prohibition marks M1 are examples of the first print image. The set of print data is an example of the first print data. The process of S2 is an example of the first data generation process.

In S4 the CPU 11 generates a set of print data for the bottom label LB. For example, for the bottom label LB shown in FIG. 4B, the CPU 11 receives edition operation of the cigarette icons M2 and the text T1, and generates the set of print data for printing the cigarette icons M2 and the text T1 as a print image to be printed on the bottom label LB. Similarly to the top label LA, the set of print data for the bottom label LB (or a print image (icons M2 and text T1) represented by the set of print data) is correlated with the type of the ink ribbon 106 for printing the cigarette icons M2 and the text T1. In other words, the set of print data for the bottom label LB is correlated with the type of the cartridge 101 for printing the cigarette icons M2 and the text T1. In the following description, "the first layer" and "the second layer" may be used for specifying "the top label" and "the bottom label" respectively.

At this time, the type of the cartridge 101 and the type of the ink ribbon 106 included the cartridge 101 are examples of the second medium type. The cigarette icons M2 and the text T1 are examples of the second print image. The set of print data is an example of the second print data. The process of S4 is an example of a second data generation process.

In this example, the set of print data for the top label LA and the set of print data for bottom label LB are generated in stated order. However, the plurality of labels L for the composite label LL may be generated in arbitrary order.

In S5 the CPU 11 receives a print start command for start printing the plurality of sets of generated print data via the operation interface 13. In this case, the order to create the labels L is predetermined so that the top label LA as the first layer is created first, and the bottom label LB is created next. The process of S5 is the operation reception process.

After S5, in S15 the CPU 11 transmits the set of print data for the top label LA generated in S2 to the label printer 3. The process of S15 is an example of the first data transmission process. In S20 the CPU 21c of the label printer 3 receives the set of print data for the top label LA transmitted in S15. The process of S20 is an example of the first data reception process.

After S15, in S25 the CPU 11 of the operation terminal 2 transmits to the label printer 3 a print execution command for executing printing the top label LA using the set of print data for the top label LA transmitted in S15. In S30 the CPU 21c of the label printer 3 receives the print execution command transmitted in S25 from the operation terminal 2. In response to reception of the print execution command, in S35 the CPU 21c drives the printing motor 32 via the motor driving circuit 33 to convey the base tape 102, the cover film 104, and the print label tape 110. Further, the CPU 21c energizes the print head 29 via the print driving circuit 34 to print the top label LA. Hereinafter, the conveyance of the base tape 102, the cover film 104, and the print label tape 110 may be referred to as the tape conveyance.

After transmission of the print execution command in S25, in S45 the CPU 11 transmits to the label printer 3 the set of print data for the bottom label LB generated in S4. The process of S45 is an example of the second data transmission process. In S50 the CPU 21c of the label printer 3 receives the set of print data for the bottom label LB transmitted in S45, and stores the received set of print data in the print buffer 21d. The process of S50 is an example of the second data acquisition process.

One important feature of the present embodiment is that the transmission and reception of the set of print data for the bottom label LB in S45 and S50 are executed at least before the completion of printing the set of print data for the top label LA in S35, as shown in FIG. 5. Further, after receiving the set of print data of the bottom label LB in S50 and printing the top label LA is completed in S35, in S55 the CPU 21c of the label printer 3 transmits to the operation terminal 2 a print completion notification notifying that printing the top label LA is completed.

Triggered by receiving the print completion notification transmitted in S55, in S60 the CPU 11 of the operation terminal 2 displays a screen representing the completion of printing the top label LA on the display 14.

The type of the ink ribbon 106 for printing the top label LA is different from the type of the ink ribbon 106 for printing the bottom label LB, as described above. Therefore, after S60, in S65 the CPU 11 determines whether the cover film 104 and the ink ribbon 106 as print media is replaced, that is, whether the cartridge 101 is replaced. This determination may be made by acquiring information from a detection sensor such as the cartridge sensor 31 provided in the label printer 3, or by receiving from a user information indicating whether the cartridge is replaced. When replacement of the cartridge is determined (S65: YES), the CPU 11 proceeds to S75. In S65 the CPU 11 waits for the replacement of the cartridge 101 while NO determination is made in S65.

In S75 the CPU 11 transmits to the label printer 3 a print execution command for executing printing the bottom label LB using the set of print data for the bottom label LB transmitted in S45. This print execution command is an example of the print start command. The process of S75 is an example of the command transmission process. In S80 the CPU 21c of the label printer 3 receives the print execution command transmitted in S75 from the operation terminal 2. The process of S80 is an example of the command reception process. The transmission and reception of the print execution command in S75 and S80 are executed after completion of printing the top label LA in S35, as shown in FIG. 5. In response to reception of the print execution command, in S85 the CPU 21c drives the printing motor 32 to perform the tape conveyance, and energizes the print head 29 to print the bottom label LB.

After the printing the bottom label LB is completed in S85, in S90 the CPU 21c of the label printer 3 transmits to the operation terminal 2 a print completion notification notifying that printing the bottom label LB is completed, and ends the process.

Triggered by receiving the print completion notification transmitted in S90, in S95 the CPU 11 of the operation terminal 2 displays a screen representing the completion of printing the bottom label LB on the display 14, and ends the process.

Effects of the Embodiment

As described in the embodiment, with respect to the set of print data for the top label LA, the print image including the prohibition marks M1 is correlated with the type of the cartridge 101 to be used for printing this print image. With respect to the set of print data for the bottom label LB, the print image including the cigarette icons M2 and the text T1 is correlated with the type of the cartridge 101 to be used for printing this print image.

In S15 the operation terminal 2 transmits the set of print data for the top label LA, and the label printer 3 starts printing the top label LA based on the set of print data transmitted from the operation terminal 2. In S45 the operation terminal 2 transmits the set of print data for the bottom label LB, and in S50 the label printer 3 receives the transmitted set of print data.

In this case, the transmission and reception of the set of print data for the bottom label LB in S45 and S50 are executed at least before the completion of printing the set of print data for the top label LA by the label printer 3. The label printer 3 receives at least part of the set of print data for the bottom label LB before printing the top label LA is completed. Accordingly, the time period required for completing printing the top label LA and the bottom label LB can be reduced by a time period required for transmitting and receiving the set of print data for the bottom label LB, compared to a case that the set of print data for the bottom label LB is transmitted after printing the top label LA is completed by the label printer 3.

Specifically, in S75 the operation terminal 2 transmits the print execution command for printing the bottom label LB based on the set of print data for the bottom label LB, and in S80 the label printer 3 receives the print execution command. After receiving this print execution command, the label printer 3 starts printing the bottom label LB. Here, the print execution command is transmitted and received in S75 and S80 after printing the top label LA is completed. That is, the set of print data for the bottom label LB is transmitted before printing the top label LA is completed while the print execution command for printing the bottom label LB is transmitted after printing the top label LA is completed. Accordingly, the time period required for completing printing the top label LA and the bottom label LB can be reduced by a time period in which the set of print data for the bottom label LB is transmitted from the operation terminal 2 to the label printer 3.

Transmitting the print execution command for printing the bottom label LB after printing the top label LA is completed means that transmitting the print execution command after waiting for completion of preparing for printing the bottom label LB in the label printer 3. Accordingly, when the cartridge 101 for creating the top label LA is currently mounted on the label printer 3, the cigarette icons M2 and the text T1, which is to be printed next, can be prevented from being erroneously printed on the label L by using the cartridge 101 currently mounted on the label printer 3.

Variations of the First Embodiment

While the present disclosure has been described in detail with reference to specific embodiment thereof it would be apparent to those skilled in the art that many modifications and variations may be made therein without departing from the scope of the invention. In the following description, like parts and components to those in the first embodiment described above are designated with the same reference numerals to avoid duplicating description.

(1-1) A Case that a Storage Capacity of the Print Buffer in the Label Printer is Considered In a case that the label printer 3 receives the set of print data for the bottom label LB during printing the top label LA, the relatively high storage capacity is required in the print buffer 21d for storing the two sets of print data. In this variation (1-2), considering this point, it is determined whether the storage capacity of the certain size can be reserved in the print buffer 21d. Ina case that the storage capacity cannot be reserved, the operation terminal 2 transmits the set of print data for the bottom label LB to the label printer 3 after waiting for completion of printing the top label LA.

A control procedure executed in tandem by the CPU 11 of the operation terminal 2 and the CPU 21c of the label printer 3 according to this variation will be described with reference to the sequence diagrams shown in FIGS. 5 and 6. The control procedure of this variation starts from S2 shown in FIG. 6, and branches from the process of S12 into the process of S15 shown in FIG. 5 and the process of S15 shown in FIG. 6.

Figure 6:
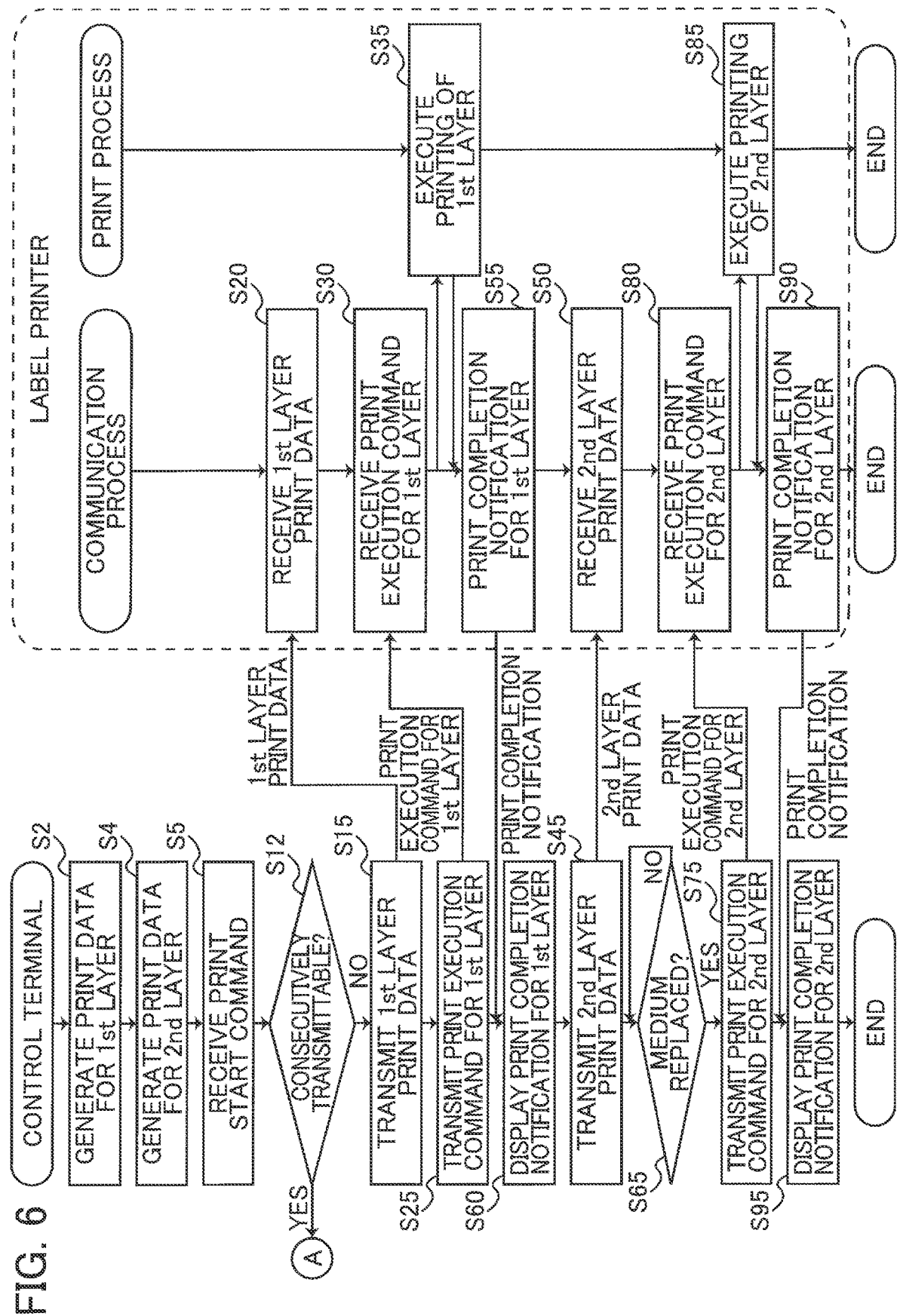
FIG. 6 is a sequence diagram illustrating a control procedure executed in tandem by the control terminal and the label printer according to a variation (1-1)

As shown in FIG. 6, the CPU 11 proceeds to S12 after executing the processes of S2, S4, and S5 similarly to the process shown in FIG. 5. In S12 the CPU 11 of the operation terminal 2 determines, based on the data size of the set of print data for the top label LA, whether the set of print data for the bottom label LB can be consecutively transmitted to the label printer 3 subsequently to transmission of the set of print data for the top label LA. This determination may be made by determining whether a difference obtained by subtracting the data size of the set of print data for the top label LA from a prescribed value is smaller than a prescribed threshold value. Here, the prescribed value is determined by considering (or depending on) the maximum storage capacity of the print buffer 21d. In other words, this determination is for determining whether the set of print data for the bottom label LB can be additionally stored in the print buffer 21d which currently stores the set of print data for the top label LA, and thus an example of the storage determination process. In a case that the set of print data for the bottom label LB can be transmitted (S12: YES), the CPU 11 proceeds to S15 shown in FIG. 5, and executes the subsequent processes shown in FIG. 5, as described above.

In a case that the set of print data for the bottom label LB cannot be transmitted (S12: NO), the CPU 11 proceeds to S15 shown in FIG. 6, the processes S20, S25, and S30 are executed, and thereafter in S35 the top label LA is printed, similarly to the processes shown in FIG. 5.

Unlike the first embodiment, the processes of S55 and S60 prior to the processes of S45 and S50 in this variation. That is, in this variation, after printing the top label LA is completed in S35, in S55 the CPU 21c transmits the print completion notification for notifying completion of printing the top label LA to the operation terminal 2. Triggered by reception of the print completion notification, in S60 the CPU 11 of the operation terminal 2 displays the screen representing that printing the top label LA is completed on the display 14.

After the process of S60, the process of S45 and S50 are executed. That is, in S45 the CPU 11 transmits the set of print data for the bottom label LB generated in S4 to the label printer 3, and in S50 the label printer 3 receives the set of print data for the bottom label LB from the operation terminal 2. The process of S45 is an example of the third transmission process.

Similarly to the processes shown in FIG. 5, after the process of S45, the processes of S65-S95 are executed by the operation terminal 2, and after the process of S50, the processes S89-S90 are executed by the label printer 3, and detailed description thereof is omitted.

Effects of the Variation

In this variation, in S12 the label printer 3 essentially determines whether the print buffer 21d of the label printer 3 can store the set of print data for the bottom label LB. In a case that the print buffer 21d cannot store the set of print data for the bottom label LB, the set of print data for the bottom label LB is transmitted to the label printer 3 in S45 after the label printer 3 completes printing the top label LA. Accordingly, the bottom label LB can be printed even in a situation that there is no enough capacity in the print buffer 21d.

(1-2) A Case that all the Sets of Print Data are Transmitted at a Time

In the first embodiment, the set of print data for the top label LA is transmitted separately from the set of print data for the bottom label LB from the operation terminal 2 to the label printer 3. In this variation (1-2), all the set of print data is transmitted from the operation terminal 2 to the label printer 3 at a time.

A control procedure executed in tandem by the CPU 11 of the operation terminal 2 and the CPU 21c of the label printer 3 according to this variation will be described with reference to the sequence diagrams shown in FIGS. 5 and 7.

Figure 7:
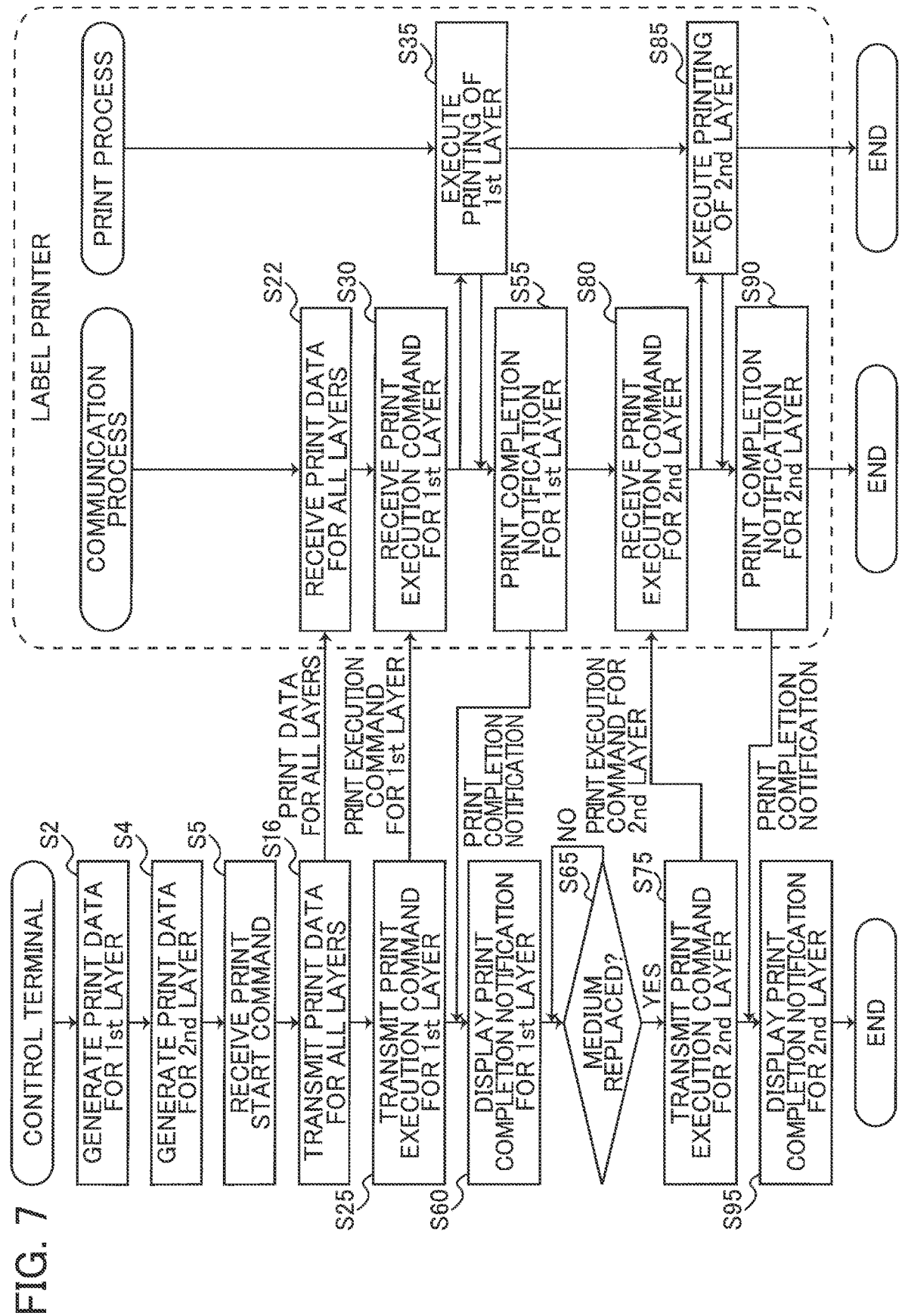
FIG. 7 is a sequence diagram illustrating a control procedure executed in tandem by the control terminal and the label printer according to a variation (1-2)

In the control procedure shown in FIG. 7, the processes of S16 and S22 are executed instead of the processes of S15 and S20 shown in FIG. 5. In the following description, "the top label and the bottom label", which specify both the top label LA and the bottom label LB, will be referred to as "all the layers" to be consistent with the first layer" and "the second layer" defined above.

In S16 all the sets of generated print data, that is, the set of print data for the top label LA and the set of print data for the bottom label LB in this example, are transmitted to the label printer 3 at a time. The process of S16 is an example of the first data transmission process and an example of the second data transmission process. In S22 the CPU 2c of the label printer 3 receives the set of print data for the top label LA and the set of print data for the bottom label LB transmitted in S16 at a time. The process of S22 is an example of the first reception process and an example of the second reception process.

After the processes of S16 and S22, the operation terminal 2 and the label printer 3 executes the processes of S25, S30, and S35 similarly to the control procedure shown in FIG. 5. After printing the top label LA is completed in S35, the process of S55 and S60 are executed similarly to the control procedure shown in FIG. 5. Thereafter, the operation terminal 2 executes the processes of S65 and the label printer 3 executes the processes of S80-S90 similarly to the control procedure shown in FIG. 5, and thus the detailed description thereof is omitted.

Effects of the Variation

In this variation, in S16 all of the set of print data for the top label LA and the set of print data for the bottom label LB are transmitted to the label printer 3 before the label printer 3 completes printing the top label LA in S35. Accordingly, the time period required for completing printing the top label LA and the bottom label LB can be reduced by a time period required for transmitting and receiving the set of print data for the bottom label LB, compared to a case that the set of print data for the bottom label LB is transmitted after printing the top label LA is completed by the label printer 3, similarly to the first embodiment. In this variation, it is not necessary that the order to create the plurality of print labels, that is, the top label LA and the bottom label LB in this example, is predetermined. Even in a case that such order is not predetermined, the effects described above can be obtained.

Second Embodiment

In the second embodiment, a control procedure is a general control that can cope with cases such as a case that the order to create print labels is not predetermined and a case that a normal label, which is not a composite label, is created. Configurations of a printing system according to the second embodiment is the same as that shown in FIGS. 1-3, and the detailed description thereof is omitted.

Control Procedure by Operation Terminal

A control procedure executed by the CPU 11 of the operation terminal 2 will be described while referring to flowcharts shown in FIGS. 8-11.

Figure 8:
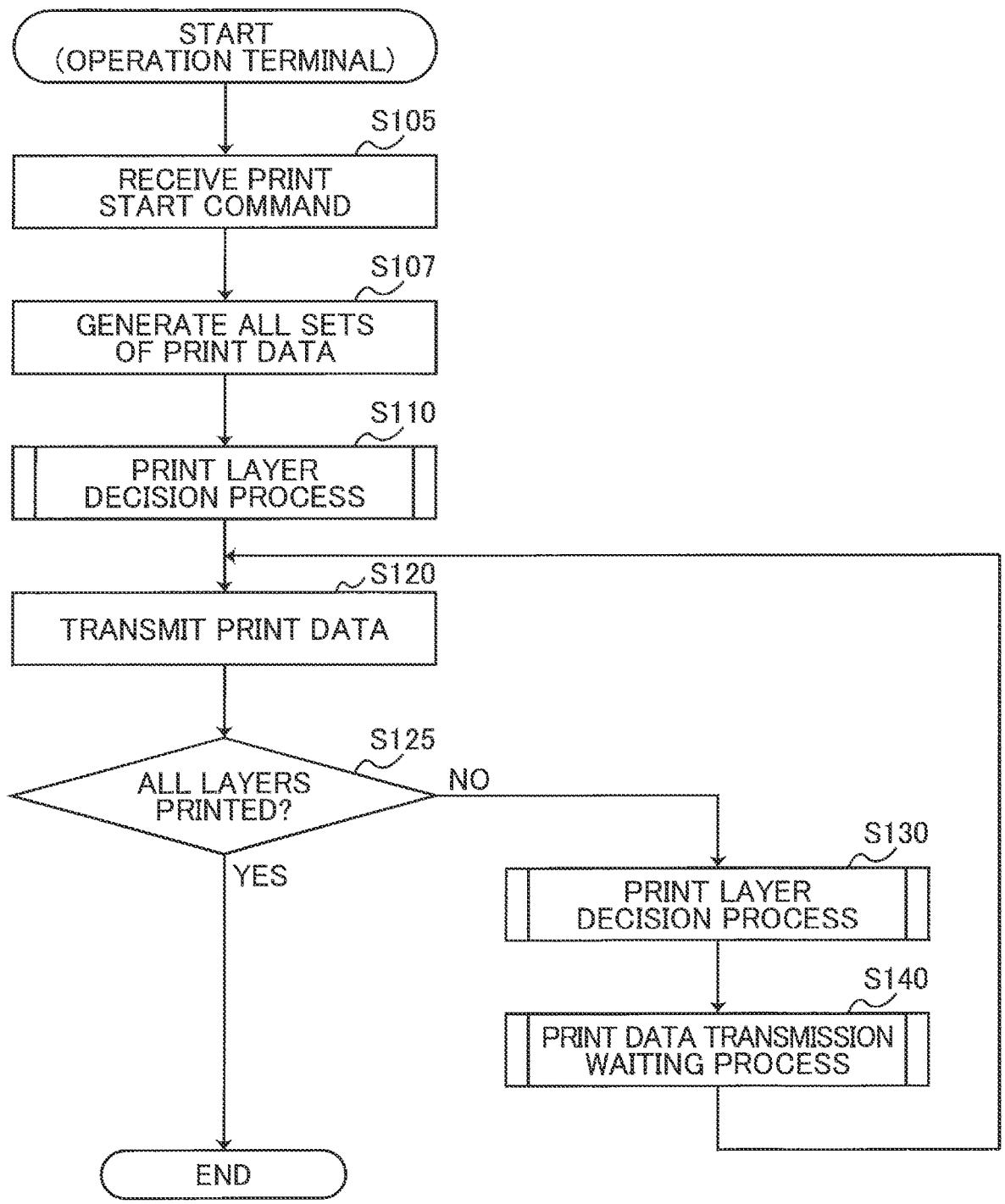
FIG. 8 is a flowchart illustrating a control procedure executed by the operation terminal according to a second embodiment.

As shown in FIG. 8, in S105 the CPU 11 receives a print start command for starting printing the plurality of print labels L via the operation interface 13. The process of S105 is an example of the operation reception process.

Next, in S107 the CPU 11 generates the sets of print data for the plurality of print labels as creating targets. This process of S107 is equivalent to the combination of the processes S2 and S4 shown in FIG. 5. As described in the first embodiment, each set of print data (or a print image data represented by the set of print data) is correlated with a type of an ink ribbon 106, that is, a type of a cartridge 101 having the ink ribbon 106. The process of S107 is an example of the first data generation process and an example of the second data generation process.

Figure 9:
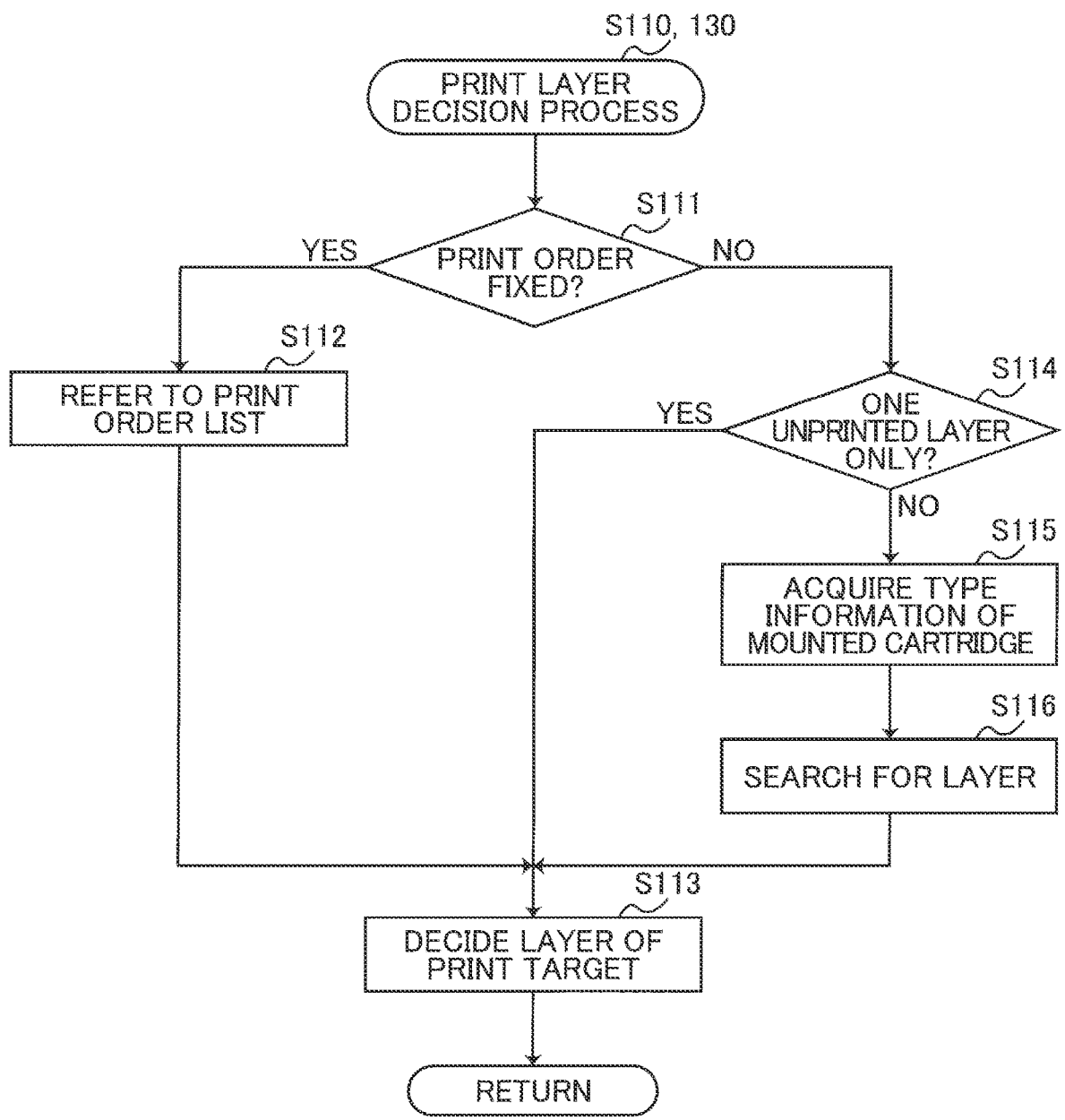
FIG. 9 is a flowchart illustrating processes of S110 and S130 shown in FIG. 8.

In S110 the CPU 11 performs a print layer decision process. In a case that the composite label LL is created by overlaying the plurality of print labels L, the plurality of sets of the print data for the plurality of print labels corresponds to (or defines) respective ones of a plurality of layers. The print layer decision process is for deciding a layer as a current print target among the plurality of layers. FIG. 9 shows a flowchart illustrating the print layer decision process.

In S111 of FIG. 9 the CPU 11 determines whether a print order of the plurality of print labels L is predetermined (or previously fixed). In a case that the print order is predetermined (S111: YES), in S112 the CPU 11 refers to a print order list representing the predetermined print order, and in S113 decides a layer as a current print target based on the print order list. Here, the print order list is generated in a prescribed method, and thereafter stored in a suitable location such as the ROM 12b. On the other hand, in a case that the print order is not predetermined (S111: NO), the CPU 11 proceeds to S114.

In S114 the CPU 11 determines whether the number of unprinted layers is one at this timing (or the number of the unprinted sets of print data is one at this timing). In a case that the number of unprinted layers is one layer (S114: YES), the CPU 11 proceeds to S113. In S113 the CPU 11 consequently decides this unprinted layer as the print target. On the other hand, in a case that the number of unprinted layers is larger than or equal to two (S114: NO), the CPU 11 proceeds to S115.

In S115 the CPU 11 acquires type information of the cartridge 101 currently mounted in the cartridge holder 22 via the communication control interface 23 and the communication control interface 15 based on the detection results of the cartridge sensor 31 of the label printer 3.

Subsequently, in S116 the CPU 11 searches for a layer corresponding to the acquisition results (the type information of the currently-mounted cartridge 10). Specifically, the CPU 11 searches for a set of print data correlated with the type information of the cartridge acquired in S115 from among the plurality of sets of print data for all the plurality of print labels unprinted. In a case that in S116 the CPU 11 cannot find a set of print data correlated with the type information of the cartridge acquired in S115, the CPU 11 may return to S115 to repeat the processes of S115 and 116. While repeating the processes of S115 and S116, the printer 3 completes printing the set of print data already transmitted in S120 and the cartridge 101 in the printer 3 is replaced to another. In a case that another cartridge 101 is replaced in the printer 3, in S115 the CPU 11 acquires the type information of another cartridge 101 and in S116 searches for a set of print data correlated with the newly acquired type information. In S113 the CPU 11 decides a set of print data found in the search as the layer to be printed (or as the current print target).

The CPU 11 ends this routine after the layer is decided in S113, and proceeds to S120 shown in FIG. 8. In S120 the CPU 11 transmits the set of print data corresponding to the layer decided in S110 as the layer to be printed (or as a print target). The process of S120 is an example of the first data transmission process and an example of the second data transmission process. Note that the process of S120 is not the example of the second data transmission process but an example of the third data transmission process in a case that the CPU 11 returns to the process of S120 after completing a print data transmission waiting process of S140 (described later) with processes of S144 and S146 executed after NO determination is made in S142.

After S120, in S125 the CPU 11 determines whether all the print labels L of creating targets have been printed by this time, that is, determines whether all the layers have been printed by this time. Ina case that all the layers have been printed (S125: YES), the CPU 11 ends this process flow. In a case that there remains at least one unprinted layer (S125: NO), the CPU 11 proceeds to S130.

Figure 10:
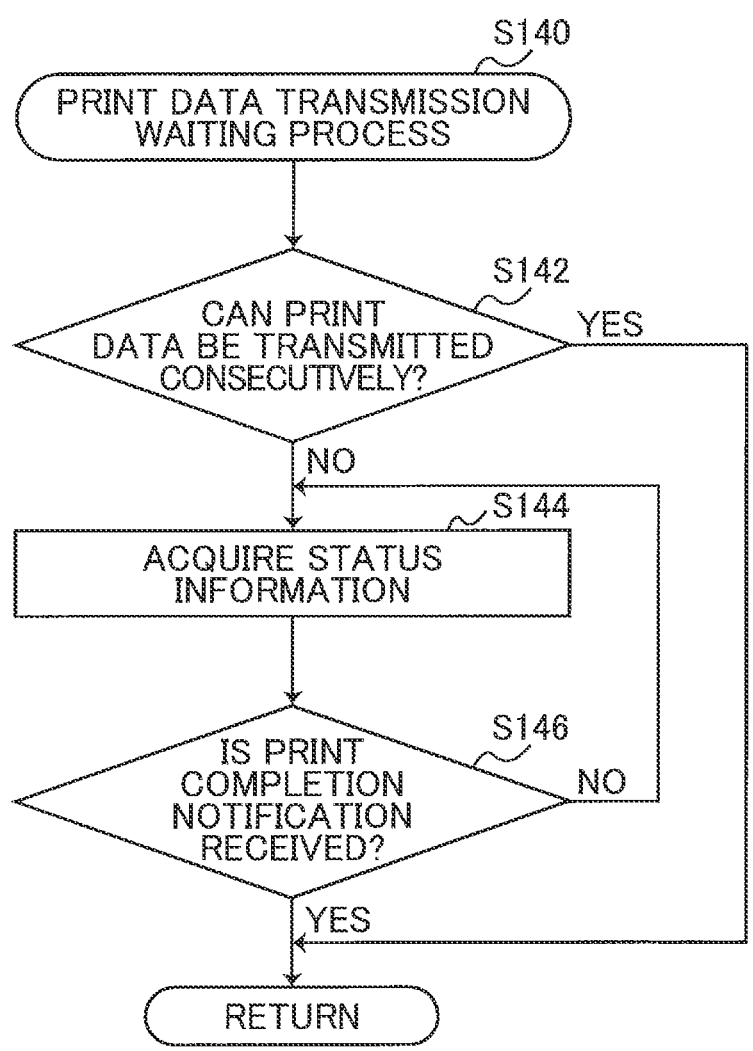
FIG. 10 is a flowchart illustrating a process of S140 shown in FIG. 8.

In S130 the CPU 11 executes the print layer decision process, which is the same as the process of S110, to decide a layer as a next print target. After S130, in S140 the CPU 11 executes the print data transmission waiting process. FIG. 10 is a flowchart illustrating the print data transmission waiting process.

In S142 of FIG. 10 the CPU 11 determines whether a set of print data for a print label L to be printed next can be consecutively transmitted to the label printer 3 subsequently to the set of print data which was already transmitted to the label printer 3 by this time. This determination may be made by determining whether a difference obtained by subtracting the data size of the set of print data which was transmitted by this time from the prescribed value is smaller than or equal to the prescribed threshold value, as described above.

Here, the prescribed value is determined by considering the maximum storage capacity of the print buffer 21d. In a case that the consecutive transmission of the sets of print data can be made (S142: YES), the CPU 11 ends the routine shown in FIG. 10 and return to S120 of FIG. 8 to transmit the set of print data. In a case that no set of print data was transmitted by this time and a first set of print data is to be transmitted, YES determination is made in S142. On the other hand, in a case that the consecutive transmission of the sets of print data cannot be made (S142: NO), the CPU 11 proceeds to S144. The process of S142 is an example of the storage determination process similarly to S122.

In S144 the CPU 11 accesses the label printer 3 via the communication control interface 15 and the communication control interface 23, and acquires from the label printer 3 status information indicating the status of the label printer 3. Specifically, the status information indicates whether the label printer 3 is currently executing printing.

After S144, in S146 the CPU 11 determines whether a print completion notification for notifying printing the print label L is completed is received from the label printer 3. In a case that the print completion notification is not received (S146: NO), the CPU 11 returns to S144. Ina case that the print completion notification is received (S146: YES), the CPU 11 ends this routine and returns to S120 shown in FIG. 8. The CPU 11 may determine that the print completion notification is received when the status information received in S144 indicates that the label print 3 is not currently executing printing.

Control Procedure by the Label Printer

The control procedure executed by the label printer 3 will be described while referring to flowcharts shown in FIGS. 11-13. In the second embodiment, the label printer 3 starts printing based on the acquired set of print data without receiving a print start command.

Figure 11:
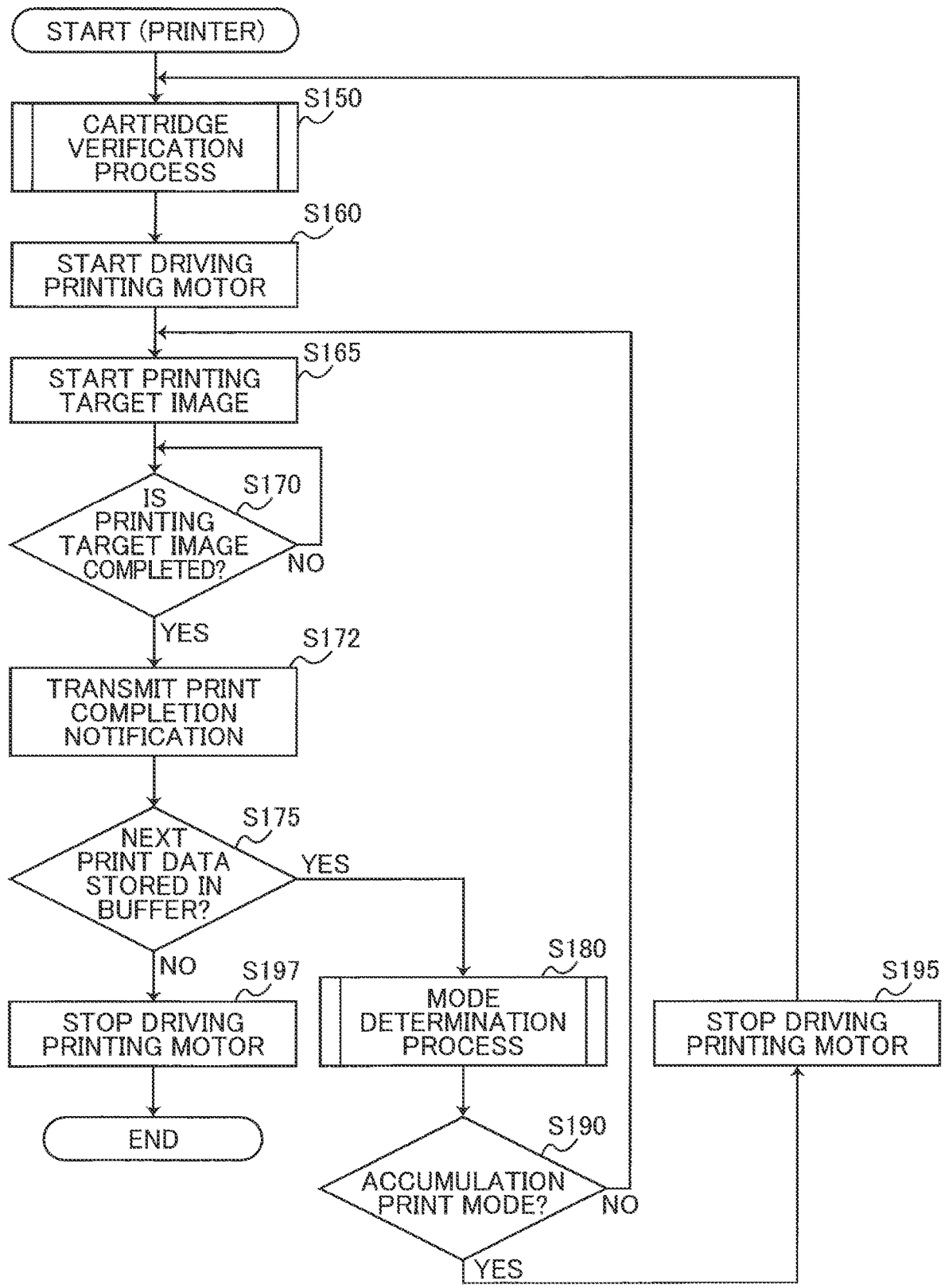
FIG. 11 is a flowchart illustrating the control procedure executed by the label printer according to the second embodiment.

The process flow shown in FIG. 11 starts when receiving and storing in the print buffer 21d a first set of print data is started. Here, the first set of print data is transmitted from the operation terminal 2. In S150 the CPU 11 executes a cartridge verification process.

Figure 12:
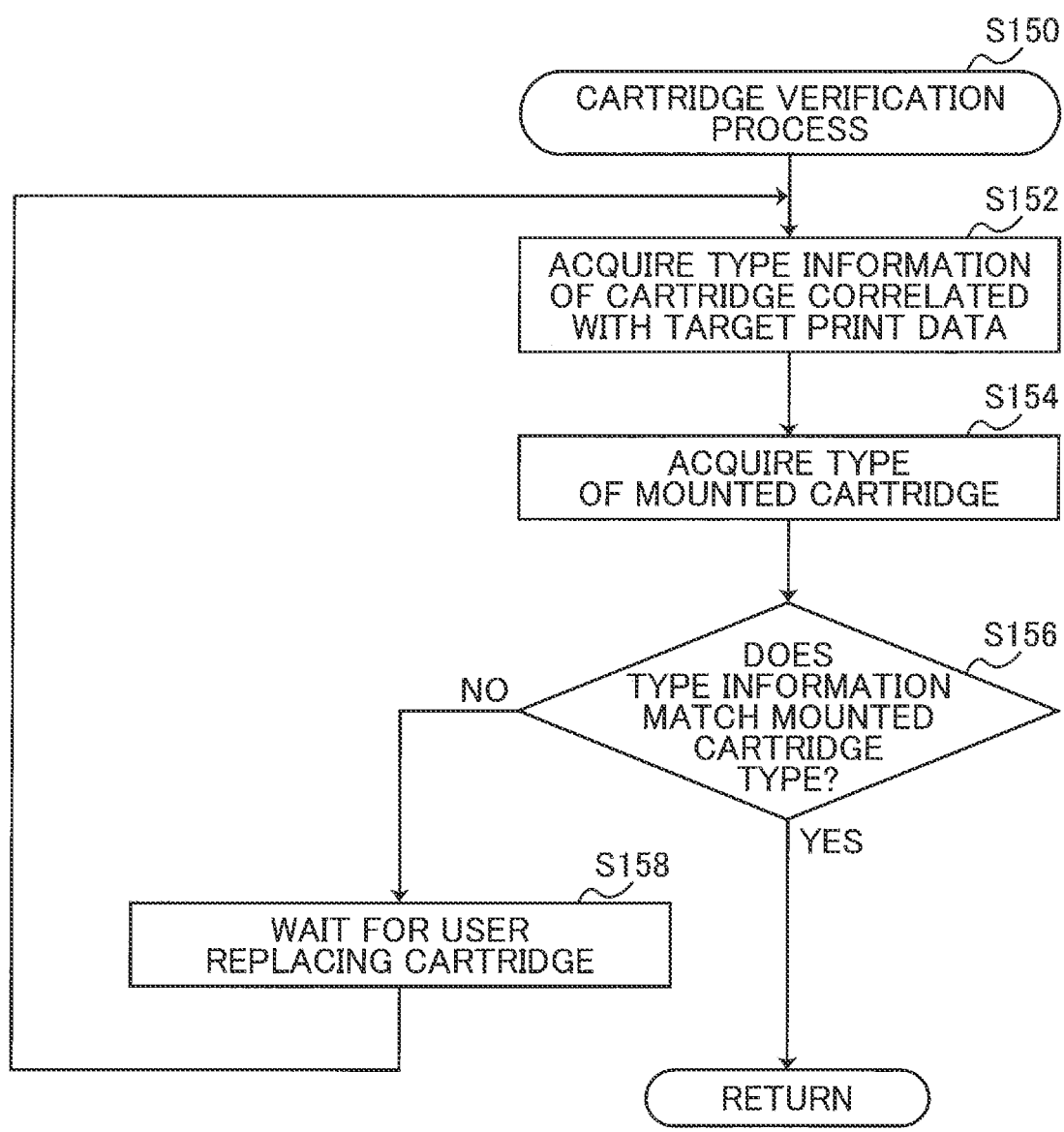
FIG. 12 is a flowchart illustrating a process of S150 shown in FIG. 11.

FIG. 12 is a flowchart illustrating the cartridge verification process. In S152 the CPU 21c acquires type information of the cartridge which is included in or linked to the received set of print data of the target print image stored in the print buffer 21d. In other words, the CPU 21c acquires the type information of the cartridge which is linked to the target print image represented by the received set of print data stored in the print buffer 21d. The type of the cartridge 101 or the type of the ink ribbon provided in the cartridge 101 is an example of the first medium type.

After S152, in S154 the CPU 21c acquires the type of the cartridge 101 currently mounted in the cartridge holder 22 based on the detection result by the cartridge sensor 31.

In S156 the CPU 21c determines whether the type information of the cartridge acquired in S152 matches the type of the cartridge 101 currently mounted in the cartridge holder 22. In a case that the type information does not match the type of the currently mounted cartridge 101 (S156: NO), the CPU 21c proceeds to S158.

In S158 the CPU 21c waits for the user replacing the cartridge 101 currently mounted in the cartridge holder 22 with another cartridge 101. In a case that it is detected by a conventional method that the currently mounted cartridge 101 is removed from the cartridge holder 22 and another cartridge 101 is mounted in the cartridge holder 22, for example, the CPU 21c returns to S152 from S158.

On the other hand, in a case that the type information of the cartridge acquired in S152 matches the type of the cartridge 101 currently mounted in the cartridge holder 22 (S156: YES), the CPU 21c ends this routine and proceeds to S160 shown in FIG. 11.

In S160 the CPU 21c starts driving the printing motor 32 via the motor driving circuit 33 to start tape conveyance. Thereafter, in S165 energizes heating elements of the print head 29 via the print driving circuit 34 while maintaining the tape conveyance so as to start printing the target print image represented by the set of print data stored in the print buffer 21d. Thereafter, in S170 the CPU 21c determines whether printing the target print image is completed. In a case that printing the target image is not completed (S170: NO), the CPU 21c waits so that printing of the target print image is continued. In the second embodiment, one of two cases are assumed in a state that printing the target print image is continued. One case is that at least part of a next set of print data for a next target print image is received and stored in the print buffer 21d, and another case is that neither a part of the set of print data nor the entire set of print data is received and thus stored in the print buffer 21d. As described later, in S175 the CPU 21c makes determination, and the results of determination in S175 depends on the two cases described here.

In a case that printing the target print image is completed (S170: YES), in S172 the CPU 21c transmits a print completion notification to the operation terminal 2, and proceeds to S175.

In S175 the CPU 21c determines whether at least part of a set of print data is stored in the print buffer 21d. In a case that neither a part of the set of print data nor the entire set of print data is stored in the print buffer 21d (S175: NO), in S197 stops driving the printing motor 32 and ends this process flow. In a case that at least a part of the set of print data is stored in the print buffer 21d (S175: YES), the CPU 21c proceeds to S180 to execute a mode determination process.

Figure 13:
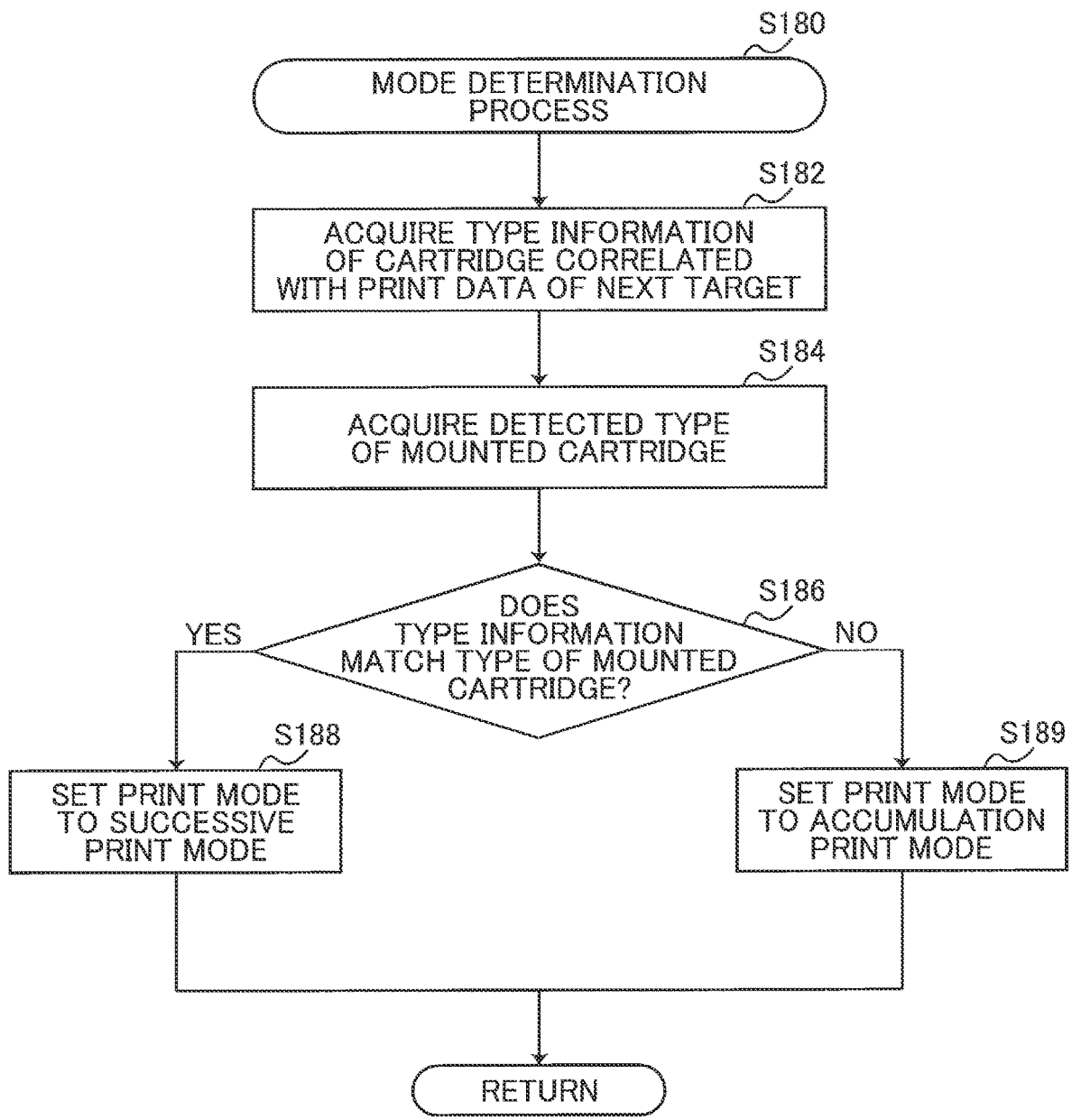
FIG. 13 is a flowchart illustrating a process S180 shown in FIG. 11.

FIG. 13 is a flowchart illustrating the mode determination process. In S182 the CPU 21c acquires type information of the cartridge which is included in or linked to the set of print data for the next target print image, similarly to S152. In other words, the CPU 21c acquires the type information of the cartridge which is linked to the next target print image represented by the set of print data stored in the print buffer 21d. The set of print data for the print image for which printing is completed is an example of first print data. The set of print data for the next target print image is an example of the second print data. The type of the cartridge 101 indicated by the type information of the cartridge acquired in S182, or the type of the ink ribbon 106 provided in this cartridge 101 is an example of the second medium type.

After S182, in S184 the CPU 21c acquires a type of the cartridge 101 currently mounted in the cartridge holder 22 based on detection results by the cartridge sensor 31, similarly to S154.

In S184 the CPU 21c determines whether the type information of the cartridge acquired in S182 matches the type of the cartridge 101 currently mounted in the cartridge holder 22 detected in S184. In a case that the type information of the cartridge acquired in S182 matches the type of the cartridge 101 currently mounted in the cartridge holder 22 (S186: YES), in S188 the CPU 21c sets a print mode of the label printer 3 to a successive print mode, and ends this routine to proceeds to S190 shown in FIG. 11. In the successive print mode, printing of the received part of the set of print data for a next print target can be started while receiving the remaining part of the set of print data for the next print target.

In a case that the type information acquired in S182 does not match the type of the currently mounted cartridge 101 detected (S186: NO), in S189 the CPU 21c sets the print mode of the label printer 3 to an accumulation print mode, and ends this routine to return S190 of FIG. 11. In the accumulation print mode, printing starts after the entire set of print data of the next print target is received.

In S190 of FIG. 11 the CPU 21c determines whether the print mode is set to the accumulation print mode. In a case that the print mode is set to the successive print mode (S190: NO), the CPU 21c returns to S165. In a case that the print mode is set to the accumulation print mode (S190: YES), in S195 the CPU 21c stops driving the printing motor 32 which was started in S160 to stop tape conveyance, waits for the cartridge 101 received with another, and waits for receiving the remaining part of the set of print data. After S195, the CPU 21c returns to S150.

Effects of the Second Embodiment

The effects the same as the first embodiment can be achieved in the second embodiment.

Specifically, at a time that the process flow shown in FIG. 11 starts, the first set of print data, which corresponds to a layer firstly decided in S110 of FIG. 8, is transmitted from the operation terminal 2 in S120, and the label printer 3 starts receiving and storing in the print buffer 21d the first set of print data.

In a case that YES determination is made in S142, a set of print data for a next layer is also transmitted from the operation terminal 2 in S120 subsequently to the set of print data for the first layer. At least part of the set of print data for the next layer is received by the label printer 3 and stored in the print buffer 21 while printing, which was started in S165 of FIG. 11, is not completed and NO determinations are made in S170.

That is, transmission of the set of print data for the next layer from the operation terminal 2 and reception of this set of print data for the next layer by the label printer 3 are executed at least before the label printer 3 completes printing the set of print data for the first layer, similarly to the control process shown in FIG. 5 in the first embodiment. Thus, at least part of the set of print data for the next layer is received by the label printer 3 before printing the print label L corresponding to the first layer is completed. Accordingly, the time period required for completing printing the two labels corresponding to the first and next layers can be reduced by a time period required for transmitting and receiving the set of print data corresponding to the next layer, compared to a case that the set of print data corresponding to the next layer is transmitted from the operation terminal 2 to the label printer 3 after printing the print label L corresponding to the first layer is completed by the label printer 3.

In the second embodiment, the plurality of layers may include three or more layers. Note that the printing method according to the second embodiment can be achieved and obtain the above described effects in a case that the print order of the plurality of layers is predetermined and thus YES determination is made in S11*l* of FIG. 9.

Alternatively, even in a case that the print order of the plurality of layers is not predetermined, the above described effects can be obtained if the number of the unprinted layers is one and thus YES determination is made in S114.

Specifically, in a case the print order of the plurality of layers depends on the cartridge 101 mounted in the label printer 3 and a plurality of sets of print data which has not been printed yet is stored in the label printer 3, a set of print data of the next print target is not decided before the set of print data, which is correlated with the type information is acquired in S115, is found. Here, in S115 the type information of the cartridge 101 can be acquired after a cartridge 101 for the next target image is mounted. Thus, after the type information of the cartridge 101 for the next print target is acquired and a set of print data is decided as a next print target in S116, the decided set of print data is transmitted to the label printer 3. However, in a case that the number of the sets of unprinted data is one, the set of print data for the next print target can be decided without performing S115 and S116.

To achieve this, determination is made in S114. In a case that the number of the unprinted sets of print data becomes one, the unprinted set of print data can be transmitted before printing the set of print data, which is transmitted most recently, is completed. Accordingly, a time period in which the label printer 3 prints the label L based on the set of print data transmitted most recently is at least partially overlapped with a time period in which the label printer 3 receives the next set of print data. Hence, the time period required for completing printing all the print labels L can be reduced by this overlapping period.

A method that all the sets of print data are transmitted at a time from the operation terminal 2 to the label printer 3 as described in the variation (1-2) shown in FIG. 7, may be applied to the method in the second embodiment. In such a case, the same effects can be obtained. In such a case, even if the print order of remaining print labels L which are to be printed after the print label L of the first layer is printed is not particularly determined, all the sets of print data are transmitted at a time. Accordingly, the time period required for completing printing all the labels L can be reduced certainly.

In the second embodiment, the CPU 11 essentially determines whether the two sets of print data for the two layers can be stored in the print buffer 21d of the label printer 3. In a case that the two sets of print data cannot be stored (S142: NO), the set of print data for the next layer is transmitted after the print completion notification for the set of print data for the first layer of the two layers is received from the label printer 3 and YES determination is made in S146. Accordingly, the set of print data for each layer can be printed even in a situation that there is no enough capacity in the print buffer 21d, similarly to the variation (1-1) shown in FIG. 6.

On the other hand, in a composite-label printing situation that a composite label LL is created by overlaying and bonding the plurality of print labels L, it is highly likely that the cartridge 101 is replaced with another after the first print label is printed and before the next print label L is printed. In this case, since printing the next print label L can be made only after the cartridge 101 is replaced with another, it is effective to complete receiving the remaining part of the set of print data for the layer during waiting for the replacement of the cartridges. On the other hand, in a normal-label printing situation that a single print label for one layer, which is to be used independently, is printed, it is not needed to wait for the replacement of the cartridges 101.

Thus, in the second embodiment, in a case that the type information of the cartridge acquired in S182 matches the type of the cartridge 101 detected in S184, a current situation is determined as the normal-label printing situation but not as the composite-label printing situation, and the print mode is set to the successive print mode. In this case, NO determination is made in S190 of FIG. 11. Accordingly, in the process of S165 executed next the CPU 21c can quickly starts printing a part of the set of print data which is already received without stopping the printing motor 32 even in a case that the label printer 3 is currently receiving a remaining part of the set of print data, thereby the entire process can be executed quickly.

On the other hand, in a case that the type information of the cartridge acquired in S182 does not match the type of the cartridge 101 detected in S184, the current situation is determined as the composite-label printing situation in which replacement of the cartridges 101 is required, and thus the print mode is set to the accumulation print mode. Accordingly, YES determination is made in S190 of FIG. 11 and in S195 the CPU 21c stops the printing motor 32 to wait for replacement of the cartridges 101 while the remaining part of the next set of print data has been received, thereby enhancing efficiency. In a conceivable case that the printing system 1 supports the normal-label printing situation only, error will occur each time the type information of the cartridge correlated with the received set of print data does not match the type of the cartridge 101 currently mounted in the cartridge holder 22. In such a conceivable case, the user must perform troublesome tasks to solve the problem related to the error. On the other hand, the successive print mode and the accumulation print mode are provided in this embodiment. In a case that the type information of the cartridge 101, which is acquired in S182 and correlated with the set of print data, does not match the type of the cartridge 101 detected in S184, the print mode is set to the accumulation print mode, thereby avoiding occurrence of the error.

According to the second embodiment, an appropriate printing can be performed in both a case that the user selects printing labels for the composite label and a case the user selects printing the normal label.

In the second embodiment, in the accumulation print mode, the process of FIG. 11 is executed in the order. S175→S180→S190→S195, and thereafter returns to S150. In S150 (S156) the CPU 21c makes YES determination when the type information of the cartridge 101 correlated with the set of print data which is already received and stored in the print buffer 21d matches the type of the currently-mounted cartridge 101, in S165 the received set of print data is printed after the process of S160. Accordingly, in the accumulation print mode, printing can be started triggered by determining that the type information of the cartridge 101 correlated with the set of print data matches the type of the currently-mounted cartridge 101. That is, printing can be started without receiving independently a print start command.

Variation to Restrict the Data Size of Print Data

In a case that all the sets of print data are transmitted from the operation terminal 2 to the label printer 3 as described in the first and second embodiments, the storage capacity of the print buffer 21d to store data generally varies depending on the model of the label printer 3.

In a case that a composite label is created from the plurality of print labels L, the data size thereof increases as the number of labels to be overlaid increases. In the present variation, in a case that a plurality of sets of print data is generated for a plurality of print labels L in S2 and S4 (FIG. 5-7) or S107 (FIG. 8), the data size of each set of print data is restricted depending on the number of labels to be overlaid. The details of this configuration will be described while referring to FIGS. 14 and 15.

A control process of the present variation executed in S2 and S4 (FIG. 5-7) or S107 (FIG. 8) by the CPU 11 of the operation terminal 2 will be described while referring to FIG. 14. A data size of a set of print data for creating the print label L increases as an area increases. Here, the area is a product of a width of the print label and the length of the print label. In this example, the length of the print label L is set as a variable to restrict the data size.

Figure 14:
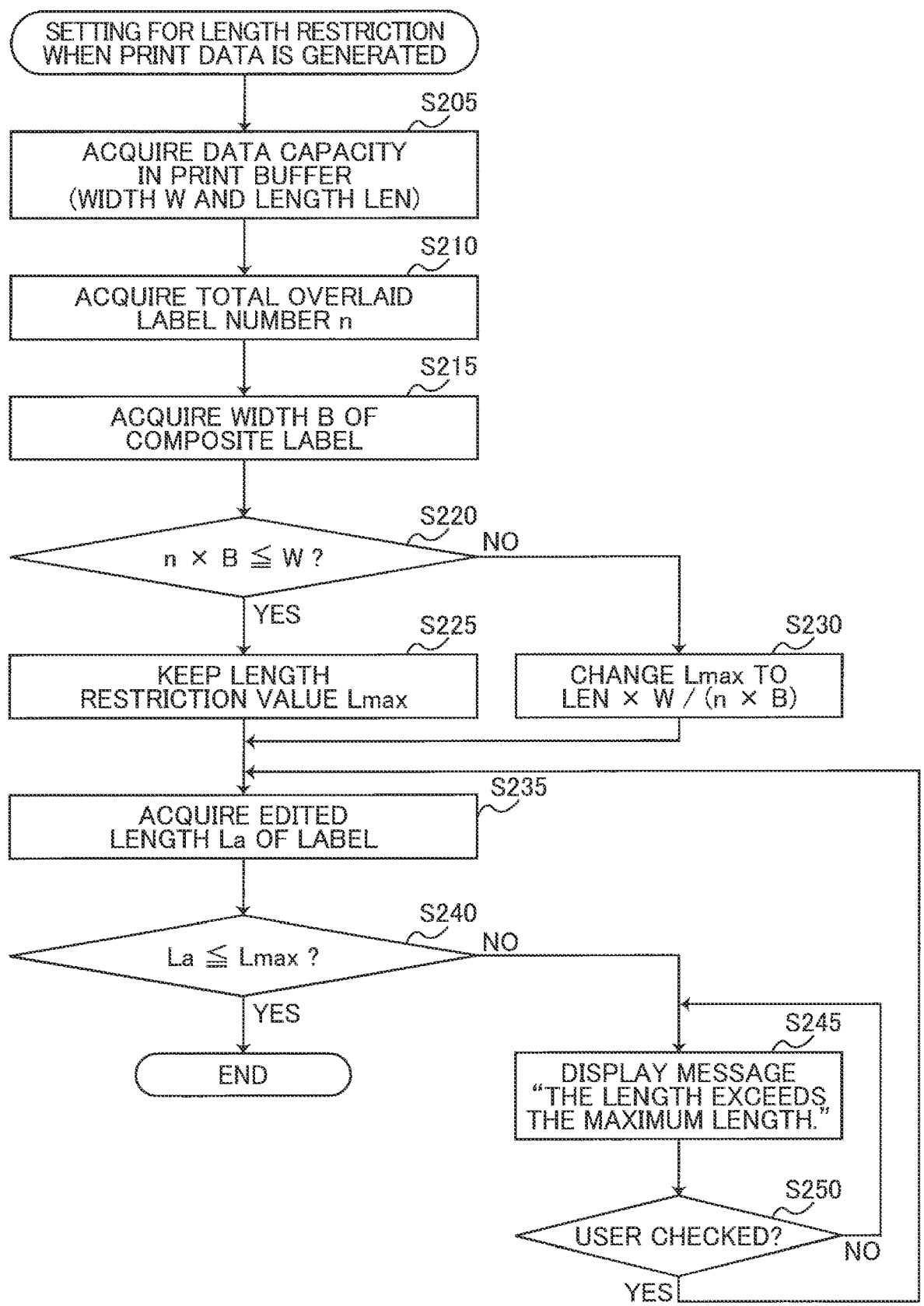
FIG. 14 is a flow chart illustrating a control procedure executed by the control terminal according to a variation in which a data size is restricted.

As shown in FIG. 14, in S205 the CPU 11 of the operation terminal 2 accesses the label printer 3 via the communication control interface 15 and the communication control interface 23 to acquire the data capacity of the print buffer 21d. Specifically, this data capacity is represented in a form of a width W and length LEN. In this case, the data capacity of the print buffer 21d indicates a memory capacity available for printing the print label L in the label printer 3, and thus the process of S205 is an example of the capacity specification process.

After S205, in S210 acquires the total overlaid label number n. Here, the total overlaid label number is the number of the plurality of labels L which is to be overlaid for a composite label LL and which is edited at this time.

In S215 the CPU 11 acquires a width B for the composite label LL configured of the plurality of labels L which is edited at this time. The width B is equivalent to the width of each print label L for composing the composite label.

After S215, in S220 the CPU 11 determines whether a product n×B is smaller than the width W acquired in S205. Here, the product n×B is a product of the total overlaid label number n acquired in S210 and the width B acquired in S215.

In a case the product n×B is smaller than or equal to the width W (n×B≤W) (S220: YES), in S225 the CPU 11 keeps (or does not change) a length restriction value Lmax, and proceeds to S235. Here, the length restriction value Lmax is predetermined by this time and for restricting the length of each print label L so that the size of the set of print data to be generated for the print label L is restricted. Specifically, the length restriction value Lmax is predetermined so that the total data size of the plurality of sets of print data to be generated for the plurality of labels L to compose the composite label LL is smaller than or equal to a prescribed size. Here, the prescribed size is a data size that can be stored in the print buffer 21d in this example.

On the other hand, in a case the product n×B is larger than the width W (n×B>W) (S220: NO), the CPU 11 proceeds to S230. In S230 the CPU 11 changes the length restriction value Lmax, which is determined by this time, so that the length restriction value Lmax decreases by using n, B, W, and the length LEN acquired in S204, as follows, Lmax=LEN×W/(n×B). Accordingly, the prescribed size is determined depending on (width W)×(length LEN)/(total overlaid label number n). The CPU 11 proceeds to S235.

In S235 the CPU 11 acquires a length La of the print label L edited at this time.

After S235, in S240 the CPU 11 determines whether the length La acquired in S235 is smaller than or equal to the length restriction value Lmax which is determined in S225 or S230.

In a case that the length La is larger than the length restriction value Lmax (La>Lmax) (S240: NO), in S245 the CPU 11 generates and displays on the display 14 a message to notify that the length of the label is larger than the maximum length. In a case that the user performs a checking operation to reduce the length La in response to the displayed message via the operation interface 13, YES determination is made in S250 which is executed next, and the process goes to S235. On the other hand, in a case that the length La acquired in S235 is smaller than or equal to the length restriction value Lmax (La≤Lmax) (S240: YES), the CPU 11 ends this process flow. The process shown in FIG. 14 may be executed repeatedly while the print labels L are edited. By restricting the length of each label L as described above, the plurality of sets of print data for the plurality of labels L for the composite label LL is generated so that the total data size of the plurality of sets of print data is smaller than or equal to the memory capacity of the label printer 3.

Figure 15A:
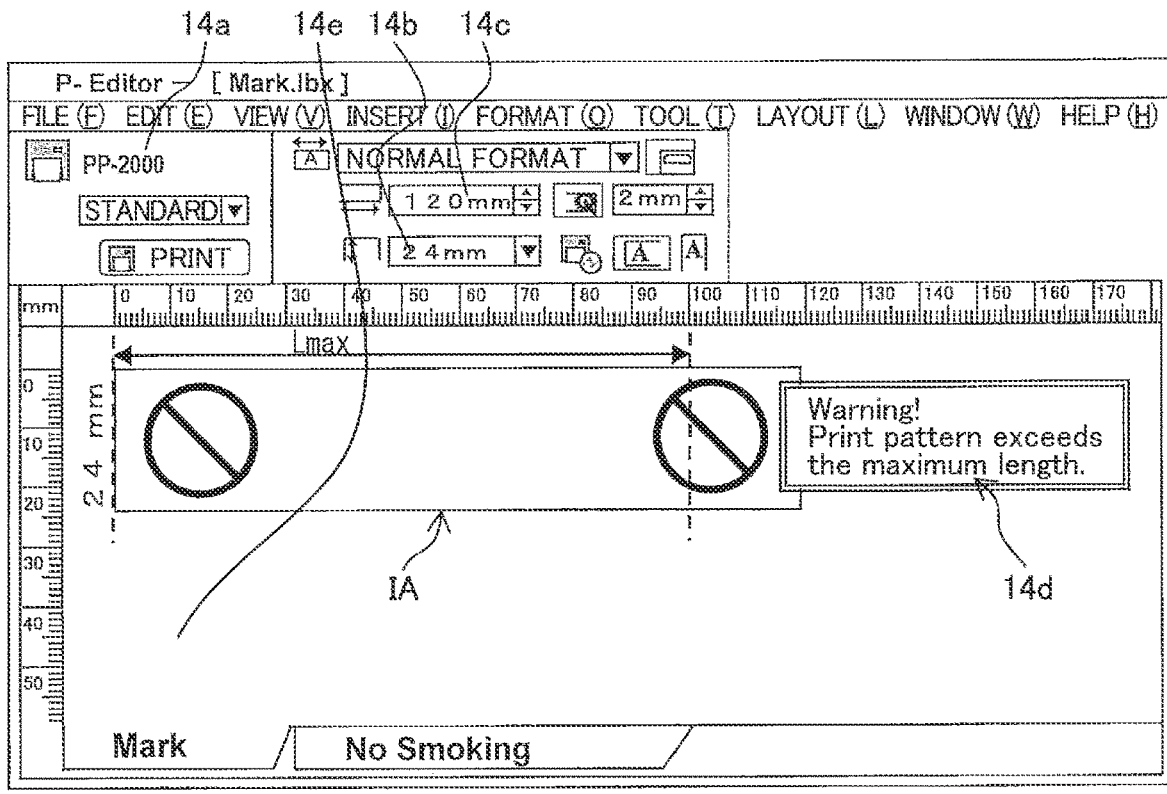
FIGS. 15A and 15B are examples of editing screens displayed on a display according to the variation illustrated in FIG. 14.
Figure 15B:
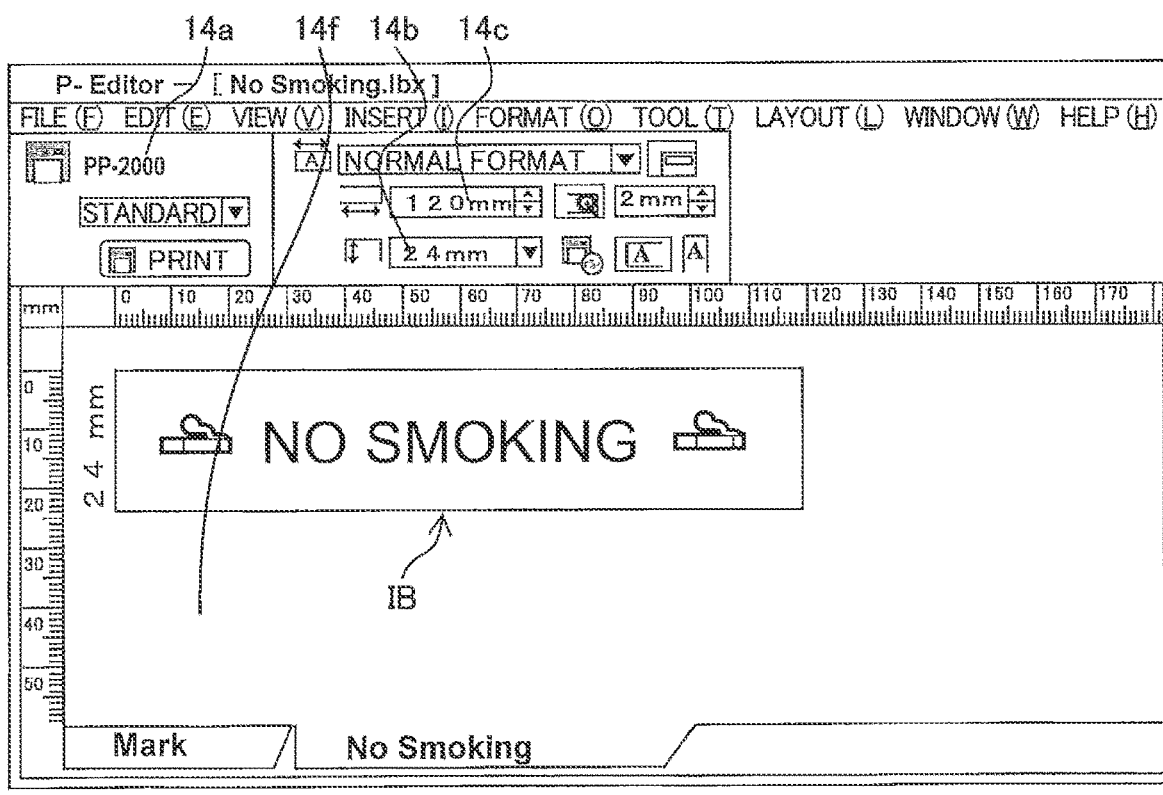

FIGS. 15A and 15B shows display examples on the display 14 of the operation terminal 2 concerning the series of processes shown in FIG. 14. Specifically, FIG. 15A shows an editing screen having a label field 14e for editing the label LA shown in FIG. 4A to generate the set of print data therefor. FIG. 15B shows an editing screen having a label field 14f for editing the bottom label LB shown in FIG. 4B to generate the set of print data therefor. The label fields 14e and 14f respectively include a top label image IA representing the top label LA and a bottom label image IB representing the bottom label LB. Each of the editing screens shown in FIGS. 15A and 15B includes a "Mark" tab for specifying the label field 14e of FIG. 15A and a "No smoking" tab for specifying the label field 14f of FIG. 15B. When the "Mark" tab or the "No smoking" tab is operated, the display 14 is switched to display the corresponding label field (14e or 14f).

Each of the editing screens shown in FIGS. 15A and 15B includes a model display field 14a, a width display field 14b, and a length display field 14c. The model display field 14a is for representing the model name "PP-2000" of the label printer 3 for example. The data capacity of the print buffer 21d is uniquely specified by the model displayed on the model display field 14a and acquired in S205.

The editing screens shown in FIGS. 15A and 15B are commonly provided with the "Mark" tab and the "No smoking" tab. The number of tabs is equivalent to the total overlaid label number n acquired in S210.

In this example, the width display field 14b displays the width for the print label which is currently edited. In the width display field 14b, the width 24 mm is set as a width for both the top label LA and the bottom label LB in this example. The top label image IA and the bottom label image IB are displayed on a scale representing the set width 24 mm. The width 24 mm is equivalent to the width B of the composite label LL acquired in S215.

The length display field 14c displays the length for the print label L which is currently edited. In the length display field 14c, the length 120 mm is set as a length for both the top label LA and the bottom label LB in this example. The top label image IA and the bottom label image IB are displayed on a scale representing the set length 120 mm. The length 120 mm is equivalent to the length La acquired in S235.

In the top label image IA and the bottom label image IB, a range representing the length restriction value Lmax is displayed together with the top label LA and the bottom label LB. In this example, the length restriction value Lmax is set to 100 mm. The value of 100 mm is equivalent to the value set in S225 or S230 shown in FIG. 14. In this case, as a result of the determination of La>Lmax, a message "Warning! The size of the print pattern exceeds the maximum length." is displayed in a message 14d in the top label image IA. The editing screen shown in FIG. 15B may also display the message 14d. The message 14d is generated in S245 of FIG. 14.

As shown in the example of FIGS. 15A and 15B, the sizes of all of the plurality of sets of data for composing the composite label LL are restricted. It may be sufficient to restrict the size of the print data only for at least one set of print data and thus it may be not necessary to restrict the sizes of all the sets of print data. Accordingly, the following effects can be obtained compared to a case that no data size is restricted when creating all the plurality of labels L.

Effects of the Variation

In this variation, a data size of at least one set of print data is restricted when the plurality of sets of print data for the print labels to compose the composite label is generated in S2 and S4 (FIG. 5-7) or S107 (FIG. 8). Specifically, in a case that the plurality of sets of data is generated in S2 and S4 of FIGS. 5-7, a data size of at least one of the sets of print data for the top label LA and the bottom label LB is restricted. The restriction of the data size is executed so that the total data size of the plurality of sets of print data for the plurality of labels to compose the composite label LL is smaller than or equal to a prescribed size. This restriction of the data size decreases the possibility that the memory overflows due to increase of the consumed memory size of the label printer 3 such as the consumed memory size of the print buffer 21d.

The present variation may be modified as follows. That is, in a case of S107 of FIG. 8, the label printer 3 may be provided with a two print modes. One mode is a composite-label mode, and another mode is a normal mode. The composite-label mode is for a case that each print image based on one of a plurality of layers is printed by a cover film 104 and an ink ribbon 106 in a different cartridge 101 to create a plurality of print labels L for compositing a composite label to be used. The normal mode is for a case that a print image for one layer is printed by a cover film 104 and an ink ribbon 106 of one cartridge 101 to create one print label L to be used solely. That is, the normal mode is set when only a label composed of a single layer is used, and the composite-label mode is set when a composite label composed of a plurality of layers is used. The composite-label mode is an example of the first print mode and the normal mode is an example of the second print mode.

In this case, in the composite-label mode, the print data size is restricted by restricting the maximum length for at least one of the plurality of print labels L according to the method described above. In the normal mode, a length is not restricted. In other words, the maximum length of each of the plurality of print labels L in the composite label mode is shorter than the maximum length of the print label L in the normal mode.

The configuration provided with the composite-label mode and the normal mode has a technical meaning described below. That is, in the composite-label mode, the memory size to be consumed increases because the label printer 3 need to store the plurality of sets of print data for the plurality of layers. Thus, the maximum length of the print label L that can be created in the composite-label mode is set to be shorter than that in the normal mode. By restricting the length of at least one of the plurality of print labels created in the composite-label mode, the consumed memory size for at least one of the plurality of sets of print data is reduced, thereby reducing the entire consumed memory size for the plurality of sets of print data in the label printer 3.

Other Variation

In the embodiments described above, printing is performed on the cover film 104 which is separate from the base tape 102, and thereafter the cover film 104 and the base tape 102 is bonded. However, the printing method is not limited to this. For example, printing may be performed on a print tape layer provided in a base tape. In this case, no cover film may be bonded to the base layer.

The procedures shown in the sequenced diagrams and the flowcharts illustrated in FIGS. 5-12, and 15 are not limited thereto, one or more processes may be added thereto and one or more processes may be deleted therefrom, and the process order may be modified without departing from the concept of the invention.

The methods in the embodiments and the variations thereof may be combined.

In addition, although not illustrated individually, the present disclosure may be implemented with various modifications without departing from the scope of the invention.

What is claimed is:

1. A non-transitory computer readable storage medium storing a set of program instructions installed on and executed by a computer provided in a terminal device configured to be connected to a printer, the set of program instructions comprising:

performing an operation reception process to receive via an operation interface a print start operation to start printing a plurality of print images which is represented by respective ones of a plurality of sets of print data, each of the plurality of print images being to be printed using a different print medium in the printer, the plurality of sets of print data including a first set of print data and a second set of print data, the first set of print data representing a first print image correlated with a first print medium type so that the printer can print the first image on the first print medium type to create a first label, the second set of print data representing a second print image correlated with a second print medium type so that the printer can print the second image on the second print medium type to create a second label, the second print medium being different from the first print medium, the first label and the second label being overlaid in a thickness direction thereof and bonded to each other to form a composite label;

performing a first data transmission process to transmit the first set of print data to the printer in response to receiving the print start operation in the operation reception process; and performing a second data transmission process to transmit the second set of print data to the printer, the second print image based on the second set of print data being to be printed after the first print image is printed, wherein the second data transmission process is performed before the printer completes printing the first print image;

wherein the set of program instructions further comprises performing a command transmission process to transmit to the printer a print start command to start printing the second print image based on the second set of print data after transmitting the second set of print data to the printer in the second data transmission process; and wherein the print start command is transmitted in the command transmission process after the printer completes printing the first print image.

2. The non-transitory computer readable storage medium according to claim 1, wherein the set of program instructions further comprises a storage determination process to determine whether a buffer region provided in the printer is capable of storing the second set of print data, wherein in a case that it is determined that the buffer is capable of storing the second set of print data, the second data transmission process transmits the second set of print data before the printer completes printing the first set of print data, wherein in a case that it is determined that the buffer is incapable of storing the second set of print data, the second data transmission process is not performed, wherein the set of program instructions further comprises performing a third data transmission process to transmit the second set of print data to the printer in a case that it is determined that the buffer is incapable of storing the second set of print data, wherein the third data transmission process is performed after the printer completes printing the first set of print data.

3. A printer comprising:

a holder in which a print medium is mountable;

a print head configured to print a plurality of print images which is represented by respective ones of a plurality of sets of print data, each of the plurality of print images being to be printed using a different print medium type in the printer, the plurality of sets of print data including a first set of print data and a second set of print data, the first set of print data representing a first print image correlated with a first print medium type so that the print head can print the first image on the first medium type to create a first label, the second set of print data representing a second print image correlated with a second print medium type so that the print head can print the second image on the second medium type to create a second label, the first label and the second label being overlaid in a thickness direction thereof and bonded to each other to form a composite label; and a controller configured to perform:
  a first data reception process to receive the first set of print data from a terminal device; and
  a second data reception process to receive the second set of print data from the terminal device, the second print image based on the second set of print data being to be printed after the first print image is printed, wherein the second data reception process is performed before printing the first print image is completed;

wherein the controller is configured to perform a command reception process to receive a print start command to start printing the second print image based on the second set of print data after the second set of print data is received in the second data reception process, wherein the print start command is received after printing the first print image is completed.

4. The printer according to claim 3, wherein the controller sets a print mode to selective one of an accumulation print mode and a successive print mode, wherein in the accumulation print mode, the print head starting printing the set of print data after the entire set of print data as a print target is received whereas in the successive print mode, even in a case that the printer receives at least part of the set of print data, the printer can start printing the set of print data using the received at least part of the set of print data while receiving a remaining part of the set of print data, wherein the controller is configured to perform a mode setting process, wherein in the mode setting process, in a case that the second print medium type correlated with the second set of print data received in the second reception process matches a type of the print medium currently mounted in the holder, the controller sets the print mode to the successive print mode, and wherein in the mode setting process, in a case that the second print medium type correlated with the second set of print data received in the second reception process does not match the type of the print medium currently mounted in the holder, the controller sets the print mode to the accumulation print mode.

5. A non-transitory computer readable storage medium storing a set of program instructions installed on and executed by a computer provided in a terminal device configured to be connected to a printer, the set of program instructions comprising:

performing an operation reception process to receive via an operation interface a print start operation to start printing a plurality of print images which is represented by respective ones of a plurality of sets of print data, each of the plurality of print images being to be printed using a different print medium in the printer, the plurality of sets of print data including a first set of print data and a second set of print data, the first set of print data representing a first print image correlated with a first print medium type, the second set of print data representing a second print image correlated with a second print medium type;

performing a storage determination process to determine whether a buffer region provided in the printer is capable of storing the second set of print data;

performing a first data transmission process to transmit the first set of print data to the printer in response to receiving the print start operation in the operation reception process; and performing a second data transmission process to transmit the second set of print data to the printer, the second print image based on the second set of print data being to be printed after the first print image is printed, wherein the second data transmission process is performed before the printer completes printing the first print image, wherein in a case that it is determined that the buffer is capable of storing the second set of print data, the second data transmission process transmits the second set of print data before the printer completes printing the first set of print data, wherein in a case that it is determined that the buffer is incapable of storing the second set of print data, the second data transmission process is not performed, wherein the set of program instructions further comprises performing a third data transmission process to transmit the second set of print data to the printer in a case that it is determined that the buffer is incapable of storing the second set of print data, wherein the third data transmission process is performed after the printer completes printing the first set of print data.

6. A printer comprising:

a holder in which a print medium is mountable;

a print head configured to print a plurality of print images which is represented by respective ones of a plurality of sets of print data, each of the plurality of print images being to be printed using a different print medium type in the printer, the plurality of sets of print data including a first set of print data and a second set of print data, the first set of print data representing a first print image correlated with a first print medium type, the second set of print data representing a second print image correlated with a second print medium type; and a controller configured to perform:
  a first data reception process to receive the first set of print data from a terminal device; and a second data reception process to receive the second set of print data from the terminal device, the second print image based on the second set of print data being to be printed after the first print image is printed, wherein the second data reception process is performed before printing the first print image is completed, wherein the controller sets a print mode to selective one of an accumulation print mode and a successive print mode, wherein in the accumulation print mode, the print head starting printing the set of print data after the entire set of print data as a print target is received whereas in the successive print mode, even in a case that the printer receives at least part of the set of print data, the printer can start printing the set of print data using the received at least part of the set of print data while receiving a remaining part of the set of print data, wherein the controller is configured to perform a mode setting process, wherein in the mode setting process, in a case that the second print medium type correlated with the second set of print data received in the second reception process matches a type of the print medium currently mounted in the holder, the controller sets the print mode to the successive print mode, and wherein in the mode setting process, in a case that the second print medium type correlated with the second set of print data received in the second reception process does not match the type of the print medium currently mounted in the holder, the controller sets the print mode to the accumulation print mode.

7. The non-transitory computer readable storage medium according to claim 5, wherein in a case the number of the plurality of sets of print data is larger than or equal to three and a printing order to print the plurality of print images is determined after printing using a first set of print data among the plurality of sets of print data is completed, the first data transmission process transmits a set of print data which is unprinted to the printer when only one set of print data remains unprinted and before the printer completes printing a print image based on a set of print data which is lastly transmitted to the printer.

8. The non-transitory computer readable storage medium according to claim 5, wherein the first data transmission process transmits all the sets of print data including the first set of print data and the second set of print data to the printer before the printer completes printing the first print image.

9. The non-transitory computer readable storage medium according to claim 8, wherein the set of program instructions further comprises:

performing a first generating process to generate the first set of print data; and performing a second generating process to generate the second set of print data, wherein the first data transmission process transmits the first set of print data generated in the first generating process, wherein the second data transmission process transmits the second set of print data generated in the second generating process, and wherein the first generating process and the second generating process respectively generate the first set of print data and the second set of print data so that a total data size of the first set of print data and the second set of print data is smaller than or equal to a prescribed data size by restricting at least one of a data size of the first set of print data and a data size of the second set of print data.

10. The non-transitory computer readable storage medium according to claim 9, wherein the set of program instructions further comprises performing a capacity specification process to specify a capacity of a memory of the printer available during printing, wherein the prescribed data size is a size of data which can be stored in the capacity of the memory.

11. The non-transitory computer readable storage medium according to claim 8, wherein the printer is configured to set selective one of a first print mode and a second print mode, in the first print mode each of the plurality of print images corresponding respectively to a plurality of layers being printed using a different print medium to create a plurality of printed matters, in the second print mode one print image corresponding to single layer is printed on a print medium to create one printed matter, wherein a maxim length of one of the plurality of printed matters created in the first print mode is larger than a maxim length of the one printed matter created in the second print mode.

12. The printer according to claim 6, further comprising a memory configured to store a received set of print data, wherein the print head prints the received set of print data in a case that the accumulation print mode is set in the mode setting process, the memory already stores the received set of print data, and a print medium type correlated with the received set of print data matches a type of the print medium currently mounted in the holder.

\* \* \* \* \*

UNITED STATES PATENT AND TRADEMARK OFFICE
CERTIFICATE OF CORRECTION

| | |
|---|---|
| PATENT NO. | : 11,630,615 B2 |
| APPLICATION NO. | : 17/388854 |
| DATED | : April 18, 2023 |
| INVENTOR(S) | : Koichi Kondo et al. |

It is certified that error appears in the above-identified patent and that said Letters Patent is hereby corrected as shown below:

On the Title Page

(72) Inventors, the addresses/residences of the first and second inventors, Koichi KONDO and Tomoyasu FUKUI, are corrected from "Nuyama" to "Inuyama"

Signed and Sealed this
Sixth Day of June, 2023

Katherine Kelly Vidal
*Director of the United States Patent and Trademark Office*